United States Patent
Kodosky et al.

(10) Patent No.: US 6,715,139 B1
(45) Date of Patent: *Mar. 30, 2004

(54) SYSTEM AND METHOD FOR PROVIDING AND DISPLAYING DEBUGGING INFORMATION OF A GRAPHICAL PROGRAM ON A FIRST COMPUTER DURING EXECUTION OF THE GRAPHICAL PROGRAM ON A SECOND COMPUTER

(75) Inventors: Jeffrey L Kodosky, Austin, TX (US); Darshan Shah, Round Rock, TX (US); Samson DeKey, Austin, TX (US); Steve Rogers, Austin, TX (US)

(73) Assignee: National Instruments Corporation, Austin, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 09/631,525

(22) Filed: Aug. 3, 2000

Related U.S. Application Data

(62) Division of application No. 08/912,445, filed on Aug. 18, 1997.

(51) Int. Cl.⁷ .................................................. G06F 9/44
(52) U.S. Cl. ........................ 717/125; 717/124; 717/126; 717/131
(58) Field of Search ................................ 717/125–135, 717/140–141, 105, 109, 124

(56) References Cited

U.S. PATENT DOCUMENTS

| | | | |
|---|---|---|---|
| 4,827,404 A | 5/1989 | Barstow et al. | |
| 4,849,880 A | 7/1989 | Bhaskar et al. | |

(List continued on next page.)

FOREIGN PATENT DOCUMENTS

| | | | |
|---|---|---|---|
| WO | WO 96 14618 A | 5/1996 | |

OTHER PUBLICATIONS

Ludolph et al., "The Fabrik programming environment", IEEE, pp. 222–230, 1988.*
Beguelin et al., "Visualization and Debugging in a Heterogenous Environment", IEEE, pp 88–95, Jun. 1993.

(List continued on next page.)

*Primary Examiner*—Tuan Dam
*Assistant Examiner*—Ted T. Vo
(74) *Attorney, Agent, or Firm*—Meyertons Hood Kivlin Kowert & Goetzel, P.C.; Jeffrey C. Hood

(57) ABSTRACT

A computer-based virtual instrumentation system including a host computer and an embedded system or device, wherein graphical programs created using the computer system can be downloaded to the embedded system for execution in a real-time or more deterministic manner. The present invention thus provides a method for automatically generating an embedded application in response to a graphical program created by a user. This provides the user the ability to develop or define instrument functionality using graphical programming techniques, while enabling the resulting program to operate in an embedded real-time system. The invention includes a novel method for configuring the embedded system. During execution of a graphical program in the embedded system, the block diagram portion executes in the embedded system, and the host CPU executes front panel display code to display on the screen the graphical front panel of the graphical program. The embedded system and the host computer exchange data using a front panel protocol to enable this operation. The present invention also includes improved debugging support for graphical programs executing on the embedded system. The host graphical programming system thus provides the user interface for graphical programs executing on the embedded system, essentially acting as the front panel "browser" for embedded applications. The host LabVIEW can also act as an independent application communicating with embedded LabVIEW through the shared memory. The host graphical programming system further provides a seamless environment in which the user can develop an embedded application using high level graphical programming techniques.

50 Claims, 17 Drawing Sheets

U.S. PATENT DOCUMENTS

| | | | |
|---|---|---|---|
| 4,901,221 A | 2/1990 | Kodosky et al. | |
| 5,109,504 A | 4/1992 | Littleton | 395/500 |
| 5,377,318 A | 12/1994 | Wolber | |
| 5,437,464 A | 8/1995 | Terasima et al. | 463/43 |
| 5,481,740 A | 1/1996 | Kodosky | |
| 5,566,295 A | 10/1996 | Cypher et al. | 345/326 |
| 5,652,909 A | 7/1997 | Kodosky | |
| 5,724,074 A | 3/1998 | Chainani et al. | 345/474 |
| 5,760,788 A | 6/1998 | Chainani et al. | 345/475 |
| 5,784,275 A | 7/1998 | Sojoodi et al. | 364/191 |
| 6,173,438 B1 * | 1/2001 | Kodosky et al. | 717/105 |

OTHER PUBLICATIONS

Jamal et al., "The Applicabiltiy of the Visual Programming Language LabVIEW to Large Real–World Application", IEEE, pp 99–106, 1995.

Per–Arne Wiberg, "Graphical Programming of Time–Deterministic Real–Time Systems", IEEE, pp 173–180, 1996.

Douglas, Bruce D., Ph.D., Custom Embedded Communication Protocols, Conference Proceedings of Embedded Systems Conference East, Mar. 10–12, 1997, Boston, Massachusetts, pp. 637–657.

Labrosse, Jean, "Inside Real–Time Kernels," Conference Proceedings of Embedded Systems Conference East, Mar. 10–12, 1997, Boston, Massachusetts, pp. 205–214.

Labrosse, Jean, "Designing with Real–Time Kernels," Conference Proceedings of Embedded Systems Conference East, Mar. 10–12, 1997, Boston, Massachusetts, pp. 379–389.

Operating Systems, $2^{nd}$ Ed. By Williams Stallings, Prentice Hall, 1995, "Multiprocessor and Real–Time Scheduling", pp. 394–415.

International Search Report for PCT/US 98/10916 dated Sep. 17, 1998.

Shearman, Sam, Assoc. Editor, "Hardware–in–the–loop connectivity extends continuous–system simulation", Personal Engineering, Jun. 1997, pp. 18–37.

"LabVIEW User Manual for Windows", National Instruments Co., pp 3/7–16, 08/93.

Philip Dean Lapsley, "Host Interface and Debugging of Dataflow DSP Systems", Thesis, 1991, pp. 1–51.

Lee et al., "Gabriel: A Design Environment for Programmable DSPs", 1998, pp. 1–11.

Lee et al., "Gabriel: A Design Environment for DSP", IEEE Transactions on Acoustics, Speech, and Signal Processing, vol. 37, No. 11, Nov. 1989, pp. 1751–1762.

Bier et al., "Gabriel: A Design Environment for DSP", IEEE Micro Issue—vol. 10, No. 5, 1990, pp. 28–45.

* cited by examiner

Structure Of Shared Memory Block

Data Channel Structure

| Fields | Token Owner | Non-Owner |
|---|---|---|
| Token Owner | R/W | R |
| Token Request (Self) | R/W (To Reset Request to False) | R/W (To Set Request to True) |
| Token Request (Other) | R | None |
| Connection (self) | R/W | R/W |
| Connection (other) | R | R |
| Data Area | R/W | None |

Privilege Of Token Owner And Non-owner

FIG. 16

SYSTEM AND METHOD FOR PROVIDING AND DISPLAYING DEBUGGING INFORMATION OF A GRAPHICAL PROGRAM ON A FIRST COMPUTER DURING EXECUTION OF THE GRAPHICAL PROGRAM ON A SECOND COMPUTER

CONTINUATION DATA

This application is a divisional of U.S. utility application Ser. No. 08/912,445 titled "Embedded Graphical Programming System," filed Aug. 18, 1997, whose inventors were Jeffrey L. Kodosky, Darshan Shah, Samson DeKey and Steven W. Rogers.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

1. Field of the Invention

The present invention relates to graphical programming, and in particular to a system and method for executing a portion or all of a graphical program in an embedded system, wherein a user interface portion of the graphical programming system optionally also executes on the host CPU.

2. Description of the Related Art

Traditionally, high level text-based programming languages have been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, and industrial automation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. No. 4,901,221 to Kodosky et al discloses a graphical system and method for modeling a process, i.e. a graphical programming environment which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, machine language instructions are automatically constructed which characterize an execution procedure which corresponds to the displayed procedure. Therefore, a user can create a computer program solely by using a graphically based programming environment. This graphically based programming environment may be used for creating virtual instrumentation systems, industrial automation systems and modeling processes, as well as for any type of general programming.

Therefore, Kodosky et al teaches a graphical programming environment wherein a user places or manipulates icons in a block diagram using a block diagram editor to create a data flow "program." A graphical program for controlling or modeling devices, such as instruments, processes or industrial automation hardware, is referred to as a virtual instrument (VI). In creating a virtual instrument, a user preferably creates a front panel or user interface panel. The front panel includes various front panel objects, such as controls or indicators that represent the respective input and output that will be used by the graphical program or VI, and may include other icons which represent devices being controlled. When the controls and indicators are created in the front panel, corresponding icons or terminals are automatically created in the block diagram by the block diagram editor. Alternatively, the user can first place terminal icons in the block diagram which cause the display of corresponding front panel objects in the front panel. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user adjusts the controls on the front panel to affect the input and views the output on the respective indicators.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), and supervisory control and data acquisition (SCADA) applications, among others.

In many instrumentation or industrial automation applications, it is necessary to guarantee real-time performance and/or more deterministic behavior for proper operation. However, current computer operating systems generally cannot guarantee real-time or deterministic performance. This is primarily due to various overhead issues, such as context switches, driver calls, disk caching, user I/O and interrupts, which limit the operating system's ability to guarantee real-time performance. Therefore, it would be desirable to provide a programmable environment which can guarantee real-time performance. It is further desirable to provide the user the maximum amount of flexibility to create his/her own real-time applications and/or define his/her own instrument real-time functionality using a high level graphical programming environment.

In many instrumentation or industrial automation applications, it is necessary to guarantee real-time performance and/or more deterministic behavior for proper operation. However, most desktop computer operating systems (e.g. Windows 95) generally cannot guarantee real-time or deterministic performance. This is primarily due to the fact that desktop operating systems (specifically, its scheduler) are designed for high throughput at the expense of determinism. This is also due to various overhead issues, such as context switches, driver calls, disk caching, user I/O and interrupts, which limit the operating system's ability to guarantee real-time performance. Therefore, it would be desirable to provide a programmable environment which can guarantee real-time performance. It is further desirable to provide the user the maximum amount of flexibility to create his/her own real-time applications and/or define his/her own instrument real-time functionality using a high level graphical programming environment.

SUMMARY OF THE INVENTION

The present invention comprises a computer-based virtual instrumentation system, herein graphical programs created using the computer system can be downloaded to an embedded system for execution in a real-time or deterministic manner. The present invention thus provides a method for automatically generating an embedded application in response to a graphical program created by a user. This provides the user the ability to develop or define instrument functionality using graphical programming techniques, while enabling the resulting program to operate in an embedded real-time system.

The preferred embodiment of the invention comprises a general purpose host computer system which includes a CPU and memory, and an embedded system or device coupled to the host computer system which also includes a CPU and memory, referred to as an embedded CPU and embedded memory. The embedded memory stores a real-time operating system kernel which provides basic OS services. The embedded system also includes a graphical program execution engine, referred to as embedded LabVIEW, which enables the embedded system to execute the graphical program.

In one embodiment, the embedded system is an interface card or device such as an Intelligent DAQ card or VXI controller interface card coupled to(or plugged in to) the host computer. In this embodiment, the embedded memory further includes a shared memory portion used for bi-directional communication between the host computer and the embedded system. In an alternate embodiment, the embedded system comprises an instrument or device connected to the computer, such as through a network connection. It is noted that the instrument or device comprising the embedded system can take any of various forms, as desired.

The host computer system includes a host graphical programming system, e.g., host LabVIEW, which is used to develop a graphical program. The host LabVIEW also executes code to display the front panel of a graphical program whose block diagram is executing on the embedded system. The host computer system also includes software according to the present invention which is operable to download software into the embedded system to configure or initialize the embedded system.

In one embodiment the embedded system has non-volatile storage media, and at power up the embedded system initializes and configures itself with a real time kernel and an embedded graphical programming system. In alternative embodiment where the embedded system does not have non-volatile boot media for storing an operating system and the embedded graphical programming system, the embedded system receives OS and programs from the host computer. In this case, the embedded system receives it OS and programs from the host computer. Since the operating system and application programs typically reside in a non-volatile media, such as a hard drive, and a computer system typically 'boots' the operating system from the hard drive, its absence means that an alternative method of booting needs to present.

When the embedded system boots up, the embedded system executes the BIOS code in the read-only memory (ROM), as is typical in any computer system. The BIOS code then executes a BIOS extension program present in memory which requests the operating system kernel from the host computer system. Therefore, the host computer first loads a kernel or basic operating system onto the embedded system. The host computer also transfers one or more other loader applications. As a result, an embedded graphical programming system and various configuration information are then loaded onto the embedded system. In the preferred embodiment, the embedded graphical programming system is embedded LabVIEW. Various software drivers are then loaded onto the embedded system. These components are loaded onto the embedded system using the shared memory and using a shared memory protocol. Thus, once the embedded system is initialized, the embedded system includes a kernel, an embedded graphical programming execution system, e.g., embedded LabVIEW, and any necessary device drivers.

After the system has been configured, the user first creates a graphical program on the host computer system using the host LabVIEW, which includes arranging on the screen a plurality of nodes comprising the graphical program. The host computer then compiles the graphical program to produce a compiled graphical program, depending on the selected target. The user also preferably selects the execution engine for the graphical program, i.e. whether the program will run on the host computer or on the embedded system. If the user has selected the execution engine in the embedded system, the host computer downloads the relevant part of the compiled graphical program to the device through a front panel protocol. The device then executes the compiled graphical program. This includes executing the execution engine to execute the compiled graphical program, as well as executing the OS kernel for basic OS services. Due to the use of a real-time operating system and reduced OS overhead, the embedded system or device executes the compiled graphical program in a deterministic manner.

The graphical program includes a graphical diagram and a graphical front panel. The graphical front panel is usable for providing/displaying input/output to/from the compiled graphical program executing on the device. During execution of a graphical program in the embedded system, the block diagram portion executes in the embedded system, and the host CPU executes front panel display code to display on the screen the graphical front panel of the graphical program. The embedded system and the host computer exchange data using a front panel protocol to enable this operation. Thus, when the device executing the compiled graphical program generates output data for display in the front panel of the graphical program, the output data is transferred to the host computer system, and the host computer system displays the output data in the graphical front panel of the graphical program. In a similar manner, when the user provides input to the graphical program via the graphical front panel, the host computer system displays the input data in the graphical front panel of the graphical program and transfers the input data to the embedded system so that the device can utilize the user input during execution of the compiled graphical program.

The present invention also includes improved debugging support for graphical programs executing on the embedded system. According to the present invention, the user can debug a graphical program executing on embedded LabVIEW utilizing the block diagram of the graphical program displayed on the display screen by the host LabVIEW.

The host LabVIEW and embedded LabVIEW exchange information to enable the user to view debugging information, such as execution highlighting and probe information, on the display screen for a graphical program executing on the embedded system. This provides greatly simplified debugging for embedded graphical programs.

The host graphical programming system or host Lab-VIEW thus provides the user interface for graphical programs executing on the embedded system. The host Lab-VIEW thus essentially acts as the front panel "browser" for embedded LabVIEW applications. The host LabVIEW can also act as an independent application communicating with embedded LabVIEW through the shared memory and/or network. The host graphical programming system further provides a seamless environment in which the user can develop an embedded application using high level graphical programming techniques.

BRIEF DESCRIPTION OF THE DRAWINGS

A better understanding of the present invention can be obtained when the following detailed description of the preferred embodiment is considered in conjunction with the following drawings, in which:

FIG. 16 is a table illustrating the privileges of token owners and non-owners.

Figure 1:
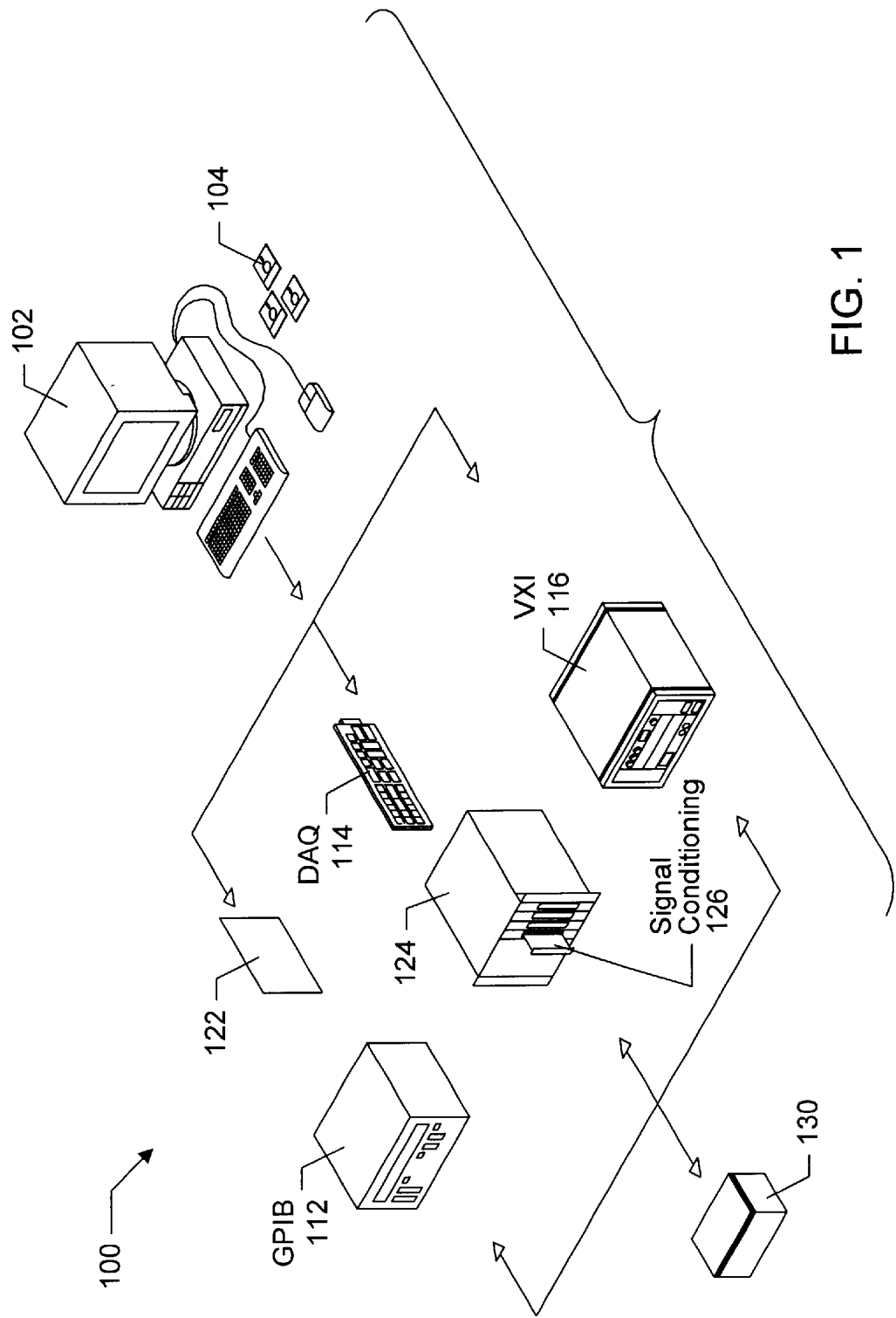
FIG. 1 illustrates an instrumentation control system.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

The following U.S. Patents and patent applications are hereby incorporated by reference in their entirety as though fully and completely set forth herein.

U.S. Pat. No. 4,901,221 titled "Graphical System for Modeling a Process and Associated Method," issued on Feb. 13, 1990.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. patent application Ser. No. 08/292,091 filed Aug. 17, 1994, titled "Method and Apparatus for Providing Improved Type Compatibility and Data Structure Organization in a Graphical Data Flow Diagram".

U.S. Pat. No. 5,475,851 titled "Method and Apparatus for Improved Local and Global Variable Capabilities in a Graphical Data Flow Program".

U.S. Pat. No. 5,497,500 titled "Method and Apparatus for More Efficient Function Synchronization in a Data Flow Program".

U.S. patent application Ser. No. 08/474,307 titled "Method and Apparatus for Providing Stricter Data Type Capabilities in a Graphical Data Flow Environment" filed Jun. 7, 1995.

U.S. Pat. No. 5,481,740 titled "Method and Apparatus for Providing Autoprobe Features in a Graphical Data Flow Diagram".

U.S. Pat. No. 5,504,917 titled "Method and Apparatus for Providing Picture Generation and Control Features in a Graphical Data Flow Environment"U.S. patent application Ser. No. 08/870,262 titled "System and Method for Detecting Differences in Graphical Programs" filed Jun. 6, 1997, whose inventor is Ray Hsu.

U.S. patent application Ser. No. 08/912,427 titled "System and Method for Converting Graphical Programs into Hardware Implemenations" and filed Aug. 18, 1997 whose inventors are Jeffrey L. Kodosky, Hugo Andrade, Brian Keith Odom, and Cary Paul Butler.

The above-referenced patents and patent applications disclose various aspects of the LabVIEW graphical programming and development system.

The LabVIEW and BridgeVIEW graphical programming manuals, including the "G Programming Reference Manual", available from National Instruments Corporation, are also hereby incorporated by reference in their entirety.

Figure 1A:
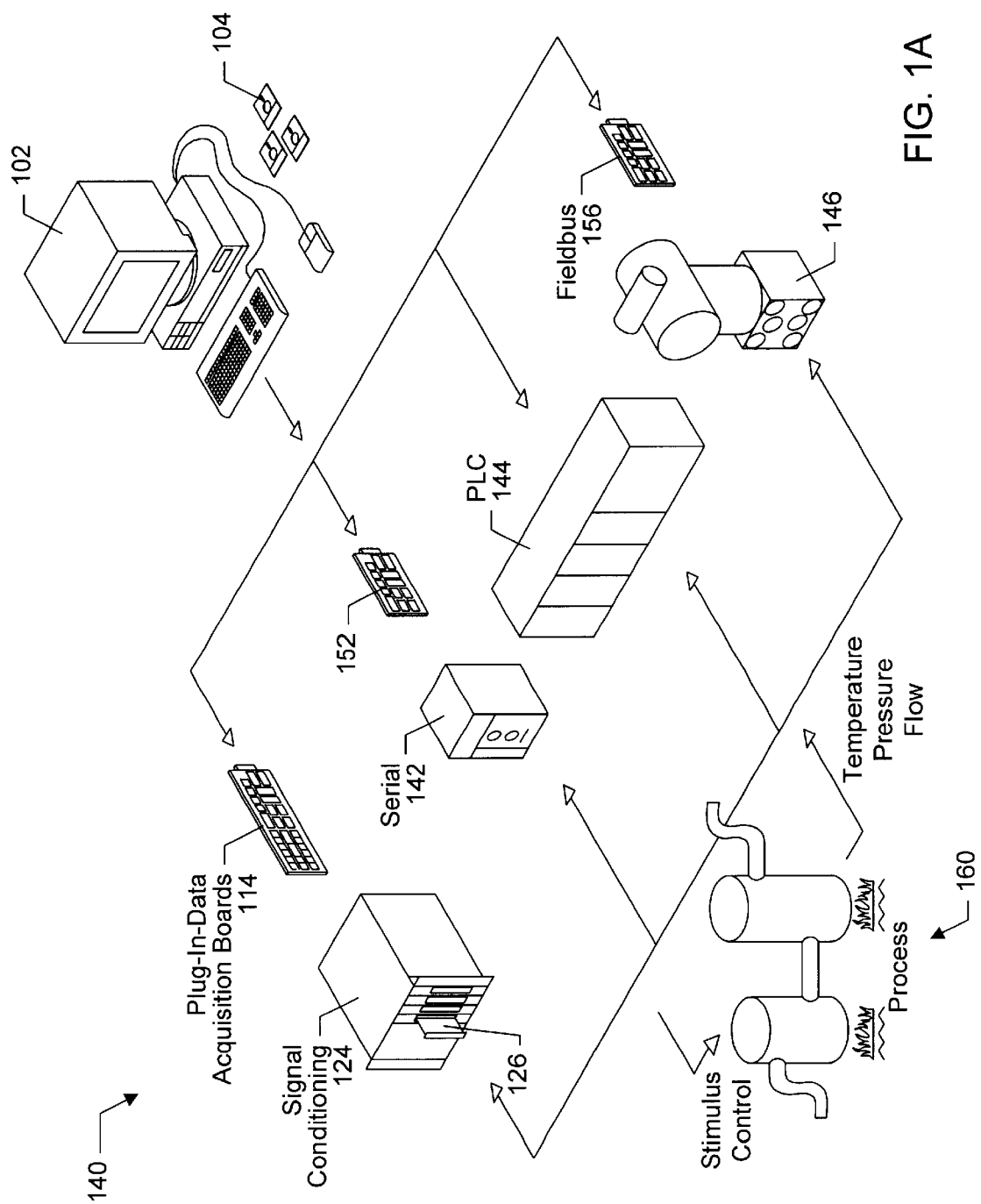
FIG. 1A illustrates an industrial automation system.

FIGS. 1 and 1A—Instrumentation and Industrial Automation Systems

Referring now to FIG. 1, an instrumentation control system 100 is shown. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 130.

The one or more instruments may include a GPIB instrument 112, a data acquisition board 114, and/or a VXI instrument 116. The GPIB instrument 112 is coupled to the computer 102 via a GPIB interface card 122 provided by the computer 102. The data acquisition board 114 is coupled to the computer 102, and preferably interfaces through signal conditioning circuitry 124 to the UUT. The signal conditioning circuitry 124 preferably comprises an SCXI (Signal Conditioning extensions for Instrumentation) chassis comprising one or more SCXI modules 126. Both the GPIB card 122 and the DAQ card 114 are typically plugged in to an I/O slot in the computer 102, such as a PCI bus slot, a PC Card slot, or an ISA, EISA or MicroChannel bus slot provided by the computer 102. However, these cards 122 and 114 are shown external to computer 102 for illustrative purposes. The VXI instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown) comprised in the computer. A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

In the embodiment of FIG. 1, one or more of the devices connected to the computer 102 comprises an embedded system which includes an embedded CPU and memory according to the present invention. The embedded system executes a real time kernel and a graphical program execution engine to enable execution of graphical programs in a real-time or deterministic manner. For example, one or more of the GPIB card 122, the DAQ card 114, or the VXI card comprise an embedded system according to the present invention. Alternatively, or in addition, one or more of the GPIB instrument 112, the VXI instrument 116, or the serial instrument comprise an embedded system according to the present invention. In one, the embedded system further comprises programmable hardware, such as an FPGA (field programmable gate array).

The instruments are coupled to the unit under test (UUT) or process 130, or are coupled to receive field signals, typically generated by transducers. The system 100 may be used in a data acquisition and control application, in a test and measurement application, a process control application, or a man-machine interface application.

Referring now to FIG. 1A, an industrial automation system 140 is shown. The industrial automation system 140 is similar to the instrumentation or test and measurement system 100 shown in FIG. 1. Elements which are similar or identical to elements in FIG. 1 have the same reference numerals for convenience. The system 140 comprises a computer 102 which connects to one or more devices or instruments. The computer 102 comprises a CPU, a display screen, memory, and one or more input devices such as a mouse or keyboard as shown. The computer 102 connects through the one or more devices to a process or device 160 to perform an automation function, such as MMI (Man Machine Interface), SCADA (Supervisory Control and Data Acquisition), portable or distributed acquisition, advanced analysis, or control.

The one or more devices may include a data acquisition board 114, a serial instrument 142, a PLC (Programmable Logic Controller) 144, or a fieldbus network card 156. The data acquisition board 114 is coupled to or comprised in the computer 102, and preferably interfaces through signal conditioning circuitry 124 to the process 160. The signal conditioning circuitry 124 preferably comprises an SCXI (Signal Conditioning extensions for Instrumentation) chassis comprising one or more SCXI modules 126. The serial instrument 142 is coupled to the computer 102 through a serial interface card 152, or through a serial port, such as an RS-232 port, provided by the computer 102. The PLC 144 couples to the computer 102 through a serial port, Ethernet port, or a proprietary interface. The fieldbus interface card 156 is preferably comprised in the computer 102 and interfaces through a fieldbus network to one or more fieldbus devices, such as valve 146. Each of the DAQ card 114, the serial card 152 and the fieldbus card 156 are typically plugged in to an I/O slot in the computer 102 as described above. However, these cards 114, 12 and 156 are shown external to computer 102 for illustrative purposes. In typical industrial automation systems a device will not be present of each interface type, and in fact many systems may only have one or more devices of a single interface type, such as only PLCs. The devices are coupled to the device or process 160.

In the embodiment of FIG. 1A, one or more of the devices connected to the computer 102 comprise an embedded system according to the present invention which includes an embedded CPU and memory according to the present invention. As noted above, the embedded system executes a real time kernel and a graphical program execution engine to enable execution of graphical programs in a real-time or deterministic manner. For example, one or more of the data acquisition board 114, the serial instrument 142, the serial interface card 152, the PLC 144, or the fieldbus network card 156 comprise an embedded system according to the present invention. In one embodiment, the embedded system further includes programmable hardware, such as an FPGA (field programmable gate array).

Referring again to FIGS. 1 and 1A, the host computer 102 preferably includes a host memory media, such as a magnetic media, CD-ROM, or floppy disks 104. The memory media preferably stores a host graphical programming development system for developing and executing graphical programs. The memory media also stores computer programs according to the present invention which are executable to download a graphical program for execution on an embedded system coupled to the computer system. The host CPU executing code and data from the host memory thus comprises a means for downloading graphical code into an embedded implementation according to the steps described below.

The embedded system comprised in the host computer 102 preferably includes a memory media which stores a real-time kernel providing basic OS services, as well as a graphical programming system run-time engine for real-time execution of compiled graphical programs. The embedded CPU executing code and data from the embedded memory thus comprises a means for executing graphical code in an embedded real-time system according to the steps described below.

The instruments or devices in FIGS. 1 and 1A are controlled by graphical software programs, optionally a portion of which execute on the CPU of the computer 102, and at least a portion of which are downloaded to the embedded system for execution. The graphical software programs which perform data acquisition, analysis and/or presentation, e.g., for instrumentation control or industrial automation, are referred to as virtual instruments.

In the preferred embodiment, the present invention utilizes the LabVIEW or BridgeVIEW graphical programming systems, hereafter collectively referred to as LabVIEW, available from National Instruments. Also, in the preferred embodiment, the term "LabVIEW" is intended to include graphical programming systems which include G programming functionality, i.e., which include at least a portion of LabVIEW graphical programming functionality, including the BridgeVIEW graphical programming system.

Also, the term "graphical programming system" is intended to include any of various types of systems which are used to develop or create graphical code or graphical programs, including LabVIEW and BridgeVIEW from National Instruments, Visual Designer from Intelligent Instrumentation, Hewlett-Packard's VEE (Visual Engineering Environment), Snap-Master by HEM Data Corporation, DASYLab by DasyTec, and GFS DiaDem, among others.

Although in the preferred embodiment the graphical programs and embedded system are involved with data acquisition/generation, analysis, and/or display, and for controlling or modeling instrumentation or industrial automation hardware, it is noted that the present invention can be used to create embedded implementations of graphical programs for a plethora of applications and are not limited to instrumentation or industrial automation applications. In other words, FIGS. 1 and 1A are exemplary only, and the present invention may be used in any of various types of systems. Thus, the system and method of the present invention is operable for creating embedded implementations of graphical programs or graphical code for any of various types of applications, including general purpose software applications such as word processing, spreadsheets, network control, games, etc.

Figure 2:
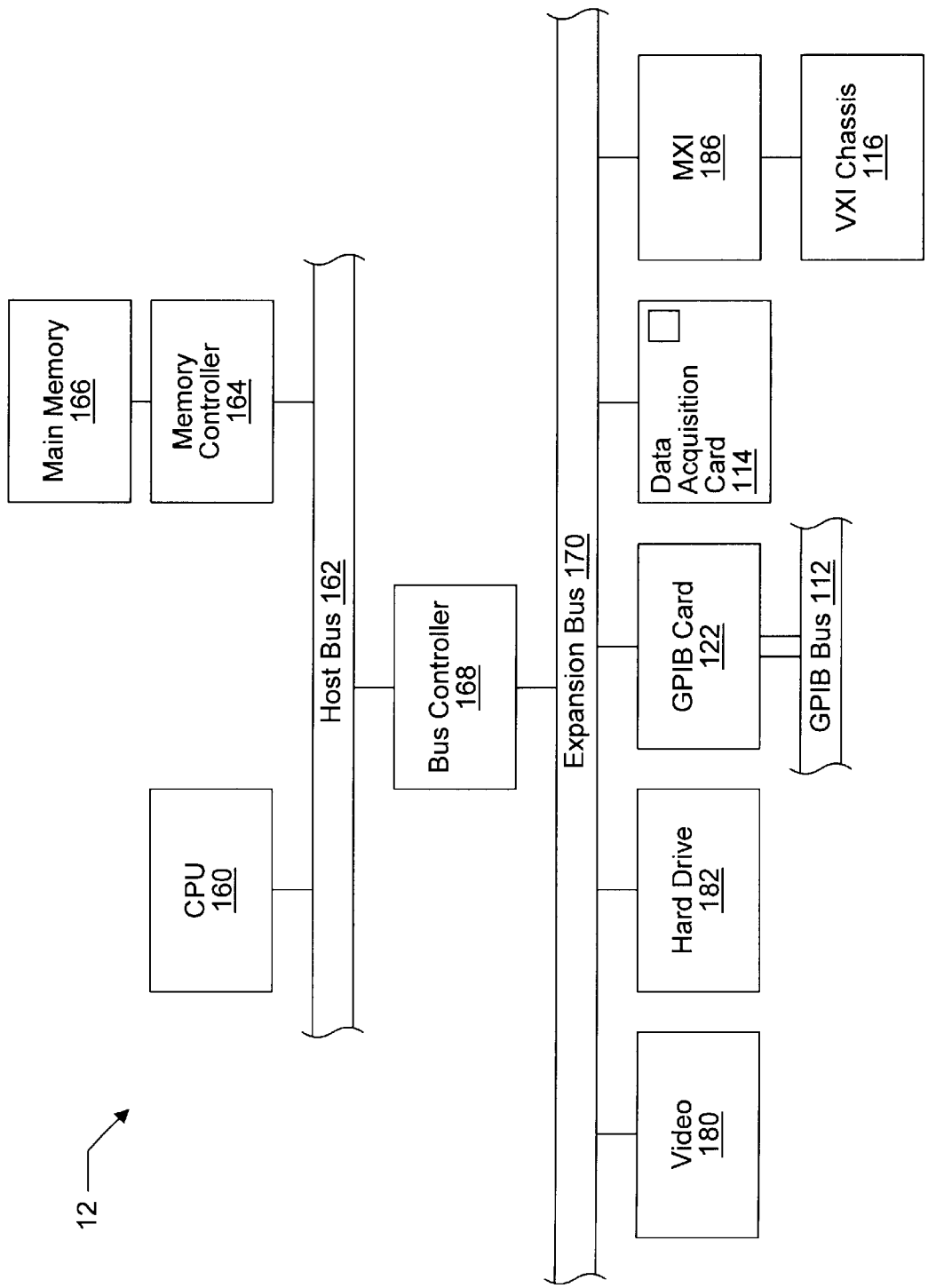
FIG. 2 is a block diagram illustrating the computer system of FIG. 1 or 1A.

FIG. 2—Computer Block Diagram

Referring now to FIG. 2, a block diagram of the host computer 102 (of FIG. 1) is shown. The elements of a computer not necessary to understand the operation of the present invention have been omitted for simplicity. The computer 102 includes at least one central processing unit or CPU 160 which is coupled to a processor or host bus 162. The CPU 160 may be any of various types, including an x86 processor, a PowerPC processor, a CPU from the Motorola family of processors, a CPU from the SPARC family of RISC processors, as well as others. Main memory 166 is coupled to the host bus 162 by means of memory controller 164. The main memory 166 stores a graphical programming system. The main memory 166 also stores operating system software as well as the software for operation of the computer system, as well known to those skilled in the art. The instrumentation control software will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1), a GPIB interface card 122 which provides a GPIB bus interface to the GPIB instrument 112 (of FIG. 1), and a VXI or MXI bus card 186 coupled to the VXI chassis 116 for receiving VXI instruments. The computer 102 further comprises a video display subsystem 180 and hard drive 182 coupled to the expansion bus 170.

One or more of the interface cards or devices coupled to the expansion bus, such as the DAQ card 114, the GPIB interface card 122, the GPIB instrument 112, or the VXI or MXI bus card 186 comprises an embedded system comprising an embedded CPU and embedded memory.

In an alternate embodiment, the embedded system is a stand-alone device, and may be coupled as a node to a network. In this embodiment, the host computer 102 is also connected as a node on the network. The embedded system may take various configurations, as desired.

Figure 3:
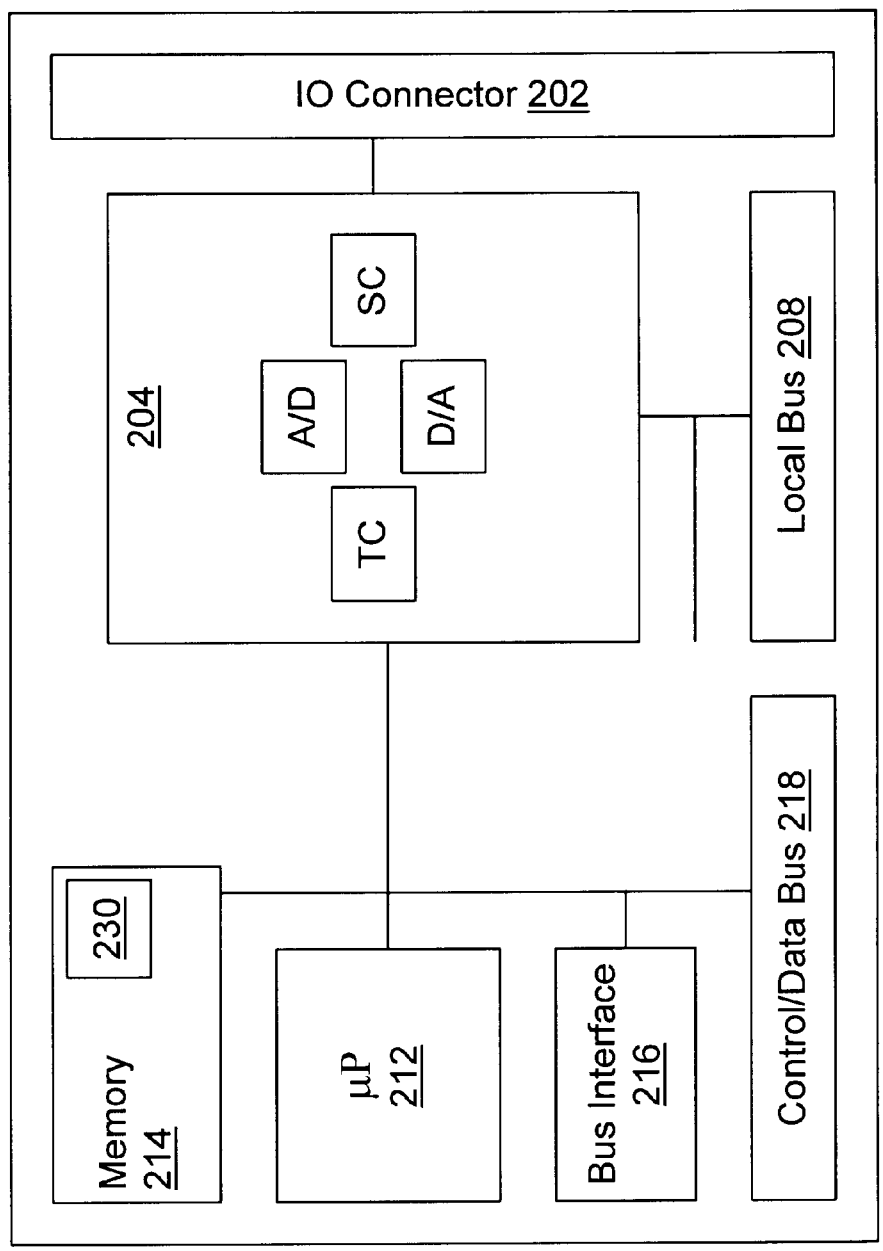
FIG. 3 is a block diagram illustrating an interface card configured with an embedded CPU and memory according to the present invention.

FIG. 3—Embedded System Diagram

Referring now to FIG. 3, a block diagram illustrating an interface card comprising an embedded system according to the present invention is shown. It is noted that FIG. 3 is exemplary only, and an interface card or device comprising an embedded system according to the present invention may have various architectures or forms, as desired. The interface card illustrated in FIG. 3 is the DAQ interface card 114 shown in either of FIGS. 1, 1A, or 2. However, as noted above, the reconfigurable hardware may be included on any of the various devices shown in FIGS. 1 or 1A, or on other devices, as desired.

As shown, the interface card 114 includes an I/O connector 202 which is coupled for receiving signals. In the embodiments of FIGS. 1 and 1A, the I/O connector 202 presents analog and/or digital connections for receiving/providing analog or digital signals. The I/O connector 202 is adapted for coupling to SCXI conditioning logic 124 and 126, or is adapted to be coupled directly to a unit under test 130 or process 160.

The interface card 114 also dedicated logic 204 for performing a specific function. In the embodiment of FIG. 3, the interface card 114 includes data acquisition (DAQ) logic 204. As shown, the data acquisition logic 204 comprises analog to digital (A/D) converters, digital to analog (D/A) converters, timer counters (TC) and signal conditioning (SC) logic as shown. The DAQ logic 204 provides the data acquisition functionality of the DAQ card 114. In the preferred embodiment, the dedicated logic 204 is comprised on a daughter card which is inserted into a connector on the main card, wherein the main card includes the other components shown in FIG. 3.

According to the preferred embodiment of the invention, the interface card 114 includes a dedicated on-board microprocessor 212 and memory 214, referred to as an embedded processor and embedded memory, respectively. This enables a portion of the graphical program to be compiled into machine language for storage in the memory 214 and execution by the microprocessor 212. As noted above, the embedded memory 214 stores a kernel providing basic OS services, as well as a graphical programming system runtime engine for real-time execution of compiled graphical programs. The embedded memory 214 is also operable to receive and store a portion or all of a compiled graphical program for execution in the embedded system. The embedded CPU 212 executes code and data from the embedded memory 214 to implement at least a portion of a virtual instrumentation or industrial automation function.

As shown, the interface card 114 further includes bus interface logic 216 and a control/data bus 218. In the preferred embodiment, the interface card 114 is a PCI bus-compliant interface card adapted for coupling to the PCI bus of the host computer 102, or adapted for coupling to a PXI (PCI extensions for Instrumentation) bus. The bus interface logic 216 and the control/data bus 218 thus present a PCI or PXI interface.

The interface card 114 also includes local bus interface logic 208. In the preferred embodiment, the local bus interface logic 208 presents a RTSI (Real Time System Integration) bus for routing timing and trigger signals between the interface card 114 and one or more other devices or cards.

Figure 3A:
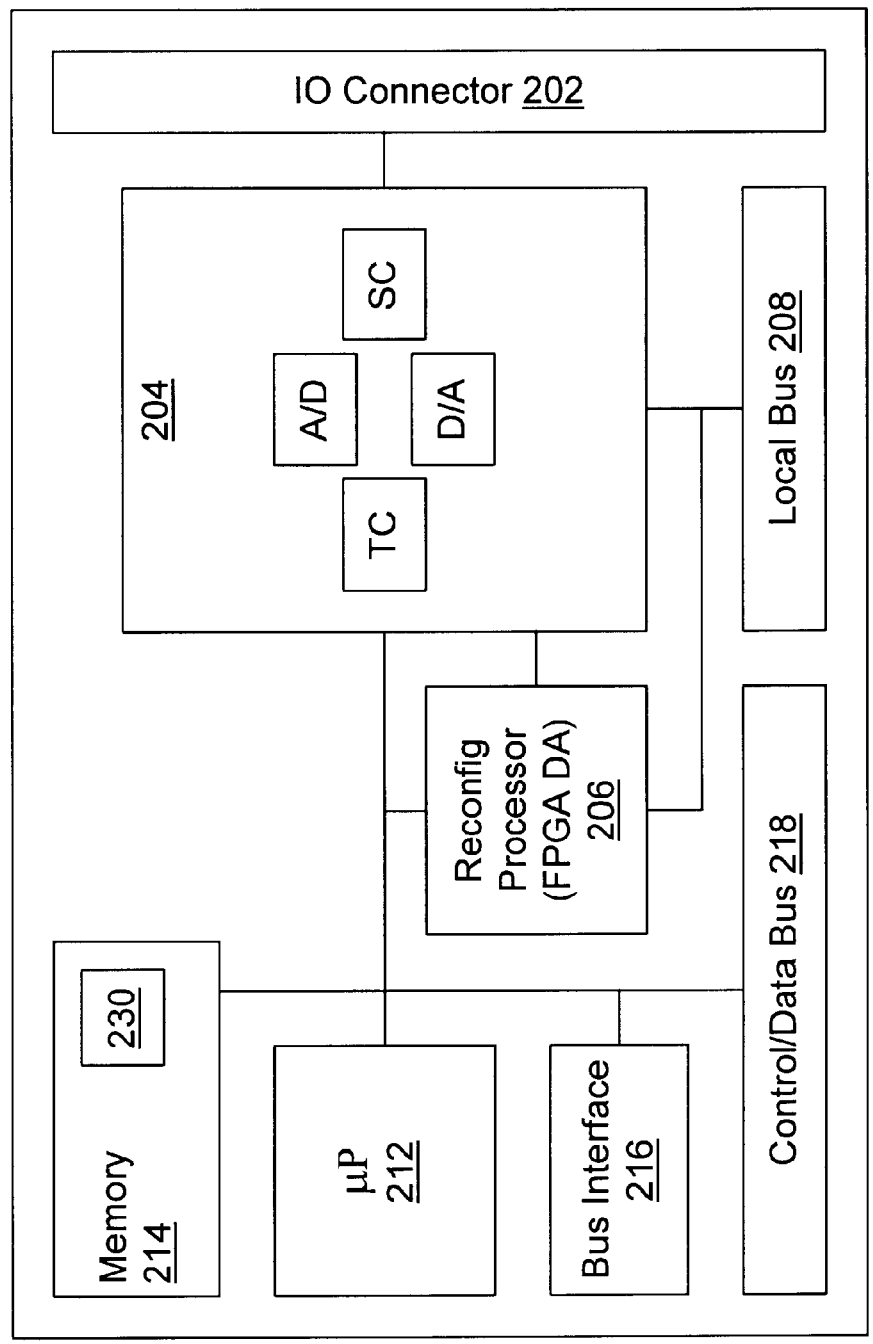
FIG. 3A is an alternate embodiment of a block diagram illustrating an interface card configured with an embedded CPU and memory according to the present invention, and also including a programmable memory.

In the embodiment of FIG. 3A, the interface card 114 further includes a programmable hardware element or programmable processor 206. In the preferred embodiment, the programmable hardware 206 comprises a field programmable gate array. (FPGA) such as those available from Xilinx, Altera, etc. The programmable hardware element 206 is coupled to the DAQ logic 204 and is also coupled to the local bus interface 208. Thus graphical programs can be created on the computer 102, or on another computer in a networked system, and, in this embodiment, one or more graphical programs can be converted into embedded hardware implementations, and at least a portion of one or more graphical programs can be converted into hardware implementation forms for execution in the FPGA 206.

Thus, in one embodiment, after one or more graphical programs have been created, one or more of the graphical programs are compiled for execution on the CPU 212 and execute locally on the interface card 114 via the CPU 212 and memory 214, and at least a portion of a second graphical program is translated or converted into a hardware executable format and downloaded to the FPGA 206 for hardware implementation.

Figure 4:
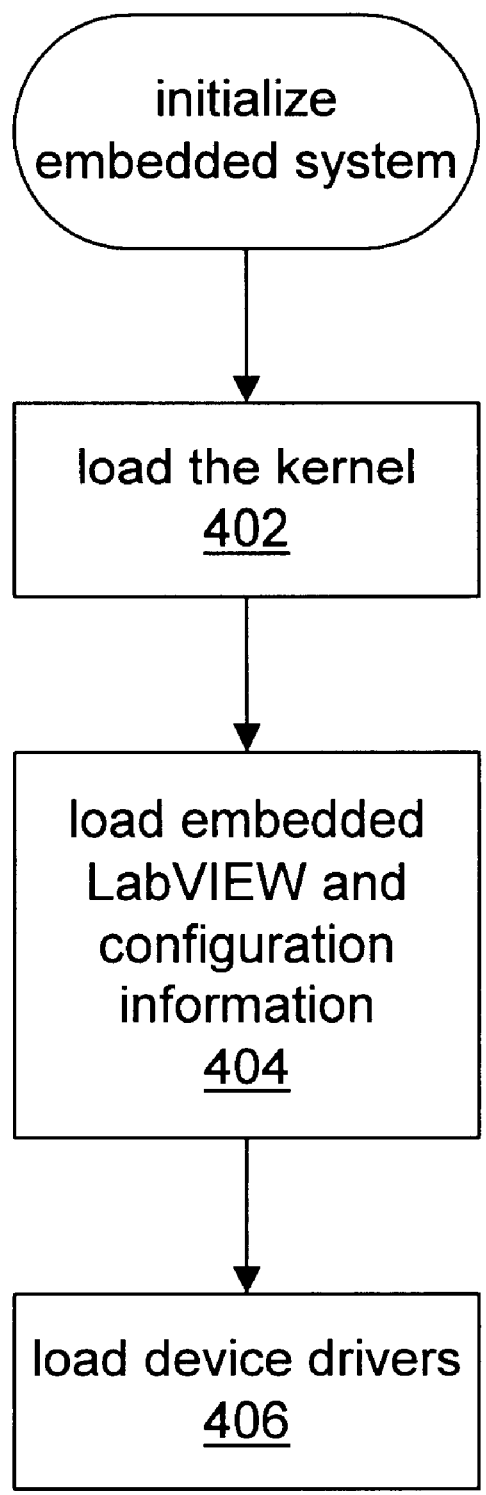
FIG. 4 is a high level flowchart diagram illustrating initialization of the embedded system according to the present invention.

FIG. 4—Initializing the Embedded System

Referring now to FIG. 4, a high level flowchart diagram is shown illustrating operation of initializing the embedded system. In the preferred embodiment, the embedded system does not include a non-volatile media, such as a hard disk, for storing software programs such as the OS kernel or the embedded graphical programming system. Since an operating system and application programs typically reside on a hard drive or non-volatile media of a computer system, and a computer system typically 'boots' the operating system from the hard drive, its absence means that an alternative method of booting needs to present. FIG. 4 illustrates loading of the various software elements comprised in the embedded system from the host computer onto the embedded system. It is noted that various of the steps in the flowcharts below can occur concurrently or in different orders.

As shown, in step 402 the kernel or basic operating system is loaded onto the embedded system. In step 404 the embedded graphical programming system and various configuration information are loaded onto the embedded system. In the preferred embodiment, the embedded graphical programming system is embedded LabVIEW. In step 406 various software drivers and/or configuration utilities are loaded onto the embedded system.

Thus, once the embedded system is initialized, the embedded system includes a kernel, an embedded graphical programming execution system, e.g., embedded LabVIEW, and any necessary device drivers. In the preferred embodiment, the kernel is the Phar Lap kernel RTOS (real time operating system) available from Phar Lap.

Figure 5A:
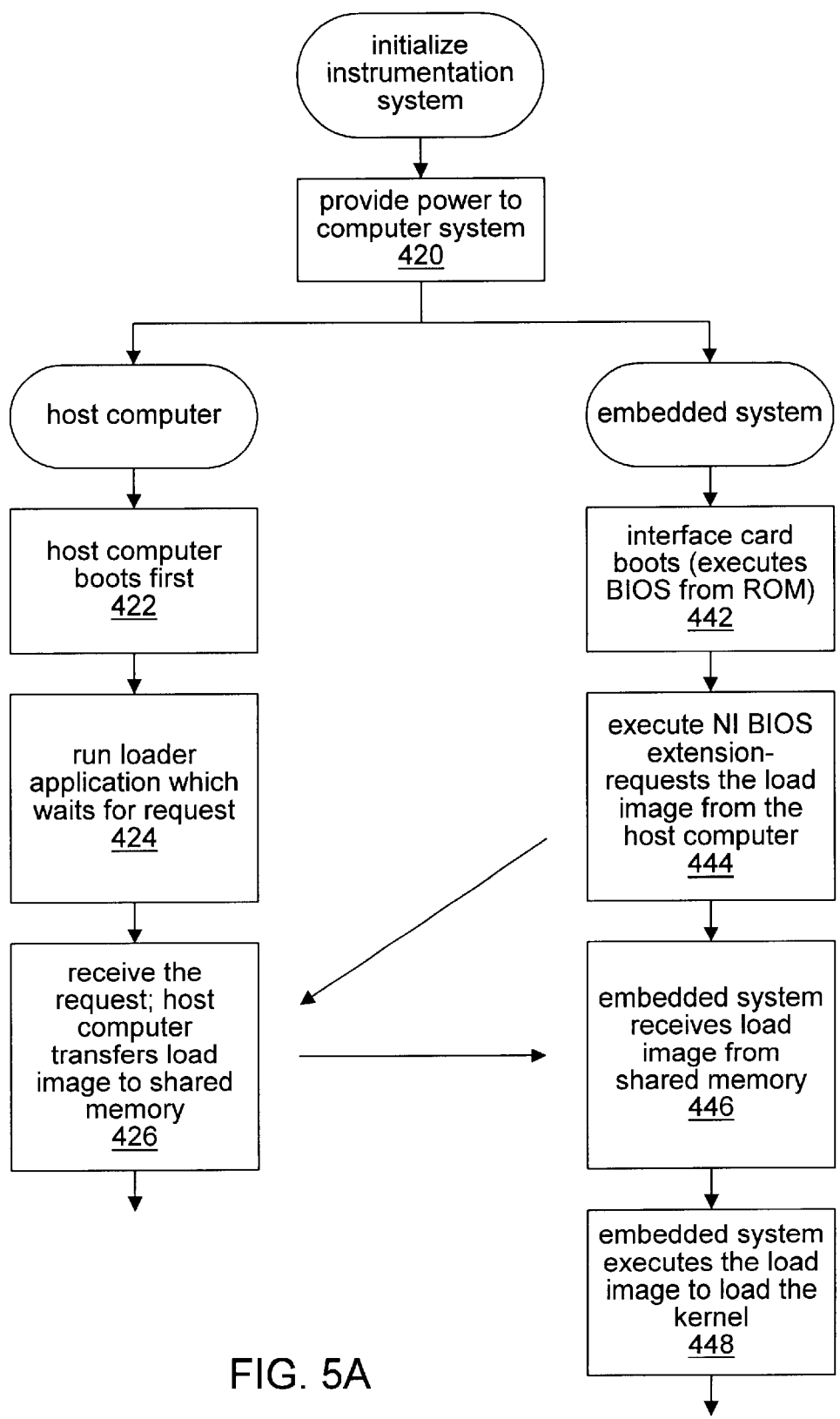
FIGS. 5A and 5B are a more detailed flowchart diagram illustrating initialization of the embedded system.
Figure 5B:
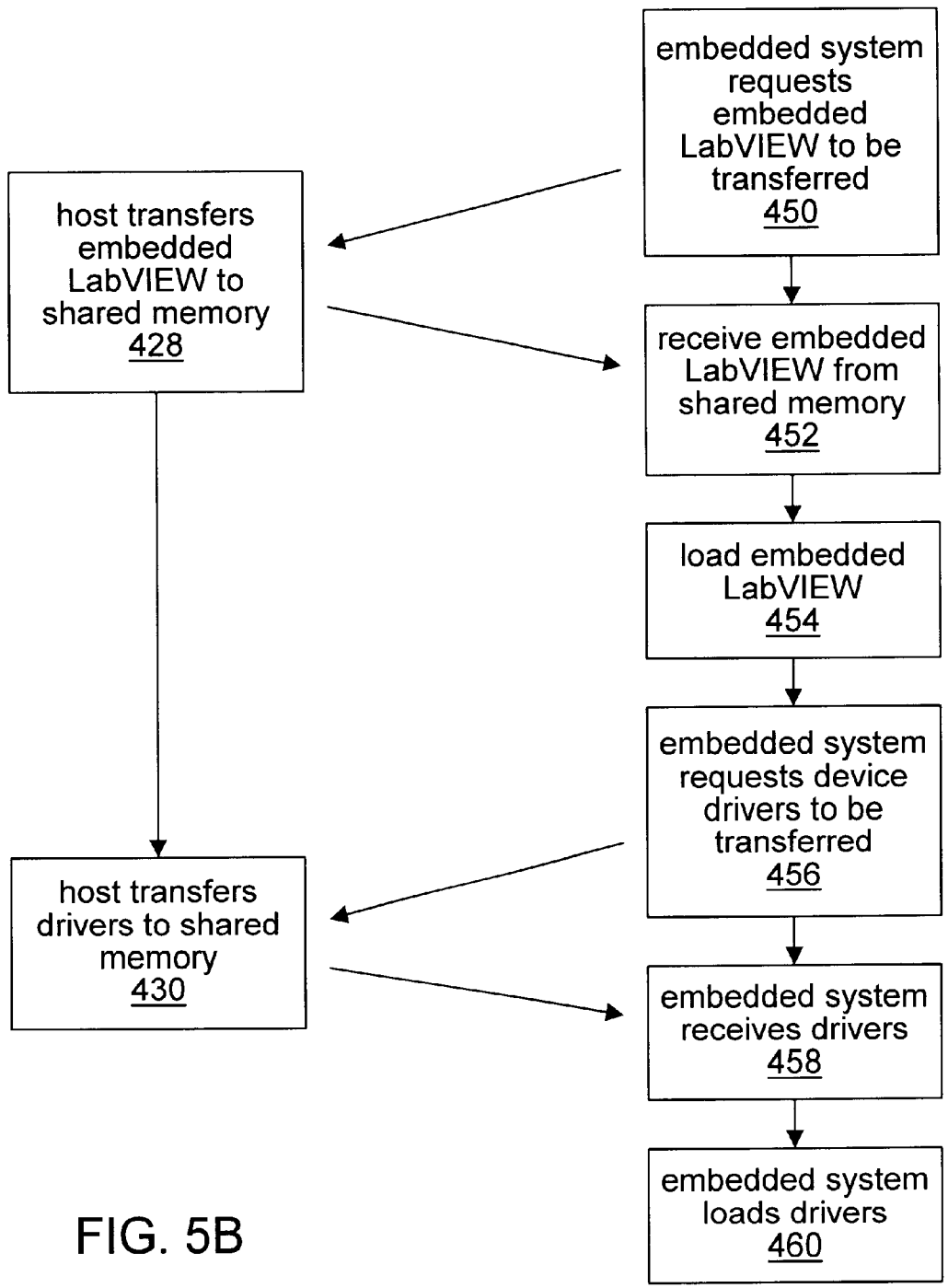

FIGS. 5A and 5B—Initializing the Embedded System

Referring now to FIGS. 5A and 5B, a more detailed flowchart is shown illustrating operation of the flowchart of FIG. 4. It is noted that FIGS. 5A and 5B collectively illustrate two separate parallel flowcharts, a first flowchart illustrating operations of the host computer 102 (steps 422–430), and a second flowchart illustrating operations of the embedded system (steps 442–460). Unless designated with arrows, it is noted that various steps in each of the two flowcharts can occur in various orders and/or simultaneously, as desired.

As shown, in step 420 power is provided to the computer system 102 and to the embedded system. In response, the host computer 102 and the embedded system perform the following operations. In step 422 the host computer 102 boots. This comprises the host computer 102 performing boot operations as is normally done in computer systems. In step 424 the host computer 102 executes a loader application which is operable to load various elements onto the embedded system. The loader application causes the host computer 102 to wait for a request from the embedded system.

Independently of steps 422 and 424, in step 442 the interface card 114 comprising the embedded system also boots up. This involves the embedded CPU 212 on the embedded system executing the BIOS (basic input/output system) from ROM comprised on the interface card 114.

After the interface card boots up in step 442, in step 444 the embedded system executes BIOS extension software according to the present invention. Thus, when the embedded system boots up, the embedded system executes the BIOS code in the readonly memory (ROM), as is typical in any computer system. The BIOS code searches for any BIOS extension program present in memory and executes any BIOS extension program that it finds. Taking advantage of this feature, a BIOS extension program is stored in the ROM, wherein the BIOS extension software is provided in addition to the normal BIOS software. The BIOS extension software is a loader program that causes the embedded system to request a load image from the host computer 102. More specifically, the BIOS extension software causes the embedded CPU 212 to set one or more bits in the shared memory on the embedded system which causes a request to be made to receive a load image from the host computer.

In response to this request for the load image by the embedded system in step 444, in step 426 the host computer 102 receives the request and operates to transfer the load image from system memory 166 to the shared memory 230 on the embedded system. In step 446 the embedded system receives the load image from the shared memory 230. This transfer utilizes a shared memory protocol which is described further below. The host computer 102 operates to transfer the load image in a plurality of iterations using block transfers. Thus it is noted that steps 426 and 446 iteratively execute a plurality of times in order to transfer portions of the load image from the host computer to the embedded system. This is primarily due to the limited size of the buffers in the shared memory 230 and thus numerous transfers are required. In other words, due to the limited size of the shared memory 230, the host CPU 160 operates to transfer the load image in sequential block transfers using the shared memory protocol.

After the embedded system has received the load image from the shared memory 230 and stored the load image in its memory 214, in step 448 the embedded CPU 212 executes the load image to load the kernel into its memory 214. In addition to the kernel being loaded into the memory 214, a small program is also loaded which, when executed, causes the embedded system to request that the embedded graphical programming system, e.g., embedded LabVIEW, be transferred to the embedded system. In response to this request in step 450, in step 428 the host transfers the embedded graphical program execution engine, e.g., embedded LabVIEW to the shared memory 230. In step 452 the embedded system receives the embedded graphical program execution engine from the shared memory 230. This transfer preferably utilizes the shared memory protocol mentioned above and described further below. In step 454 the embedded system loads the embedded graphical program execution engine into its memory 214.

In step 456 the embedded system requests software drivers from the host system. In response to this request, in step 430 the host transfers the drivers to the shared memory 230, and in step 458 the embedded system receives the drivers. This transfer also preferably utilizes the shared memory protocol mentioned above and described further below. For example, where the embedded system resides on the DAQ card 114, data acquisition drivers are preferably loaded on the system, preferably the NI-DAQ drivers available from National Instruments. In alternate embodiments where the embedded system is a different type of device, such as a GPIB interface card, or an image acquisition device, then the respective driver is loaded onto the system.

Any device drivers or configuration utilities which are downloaded preferably make use of an OS independent API. The actual device driver is preferably a Phar Lap DLL.

For more information on an alternate embodiment of booting the embedded system, please see U.S. Pat. No. 5,887,164 titled "System and Method for Enabling a Target Computer to Use Storage Resources of a Host Computer" filed Jun. 6, 1997 and issued on Mar. 23, 1999, whose inventor is Vivek Gupta, which is assigned to National Instruments Corporation.

Embedded Graphical Programming System
(Embedded LabVIEW)

The following comprises a list of the major components in the host LabVIEW graphical programming system. The components which are marked  are included in Embedded LabVIEW. The components which are not marked  are not included in Embedded LabVIEW.

1. Editor
   Panel, Block Diagram, Data Manager, find, Diff, Project
   Builder, Hierarchy, Load, Save, undo, . . . etc
2. Compiler
   Code Generation
3. Linker **
4. Kernel **
5. Execution Engine **
   Debugging Tools/Mechanism **
     Break Points **
     single stepping **
     Probe **
6. Type/Unit Propagation
7. Server **
   Application Server **
   TCP Server **
8. Front Panel Protocol ** (New Component added in LabVIEW to support ELV)

Managers:
9. Memory **
10. Configuration **
11. Color
12. Connection **
13. Device **
14. Draw
15. Drag N Drop
16. External Code **
17. File **
18. Image
19. Menu
20. Resource
21. Scroll
22. Support **
23. Text 24. Font
25. Thread **
26. Window FIG. 6—Creation and Execution of a Graphical Program.

Figure 6:
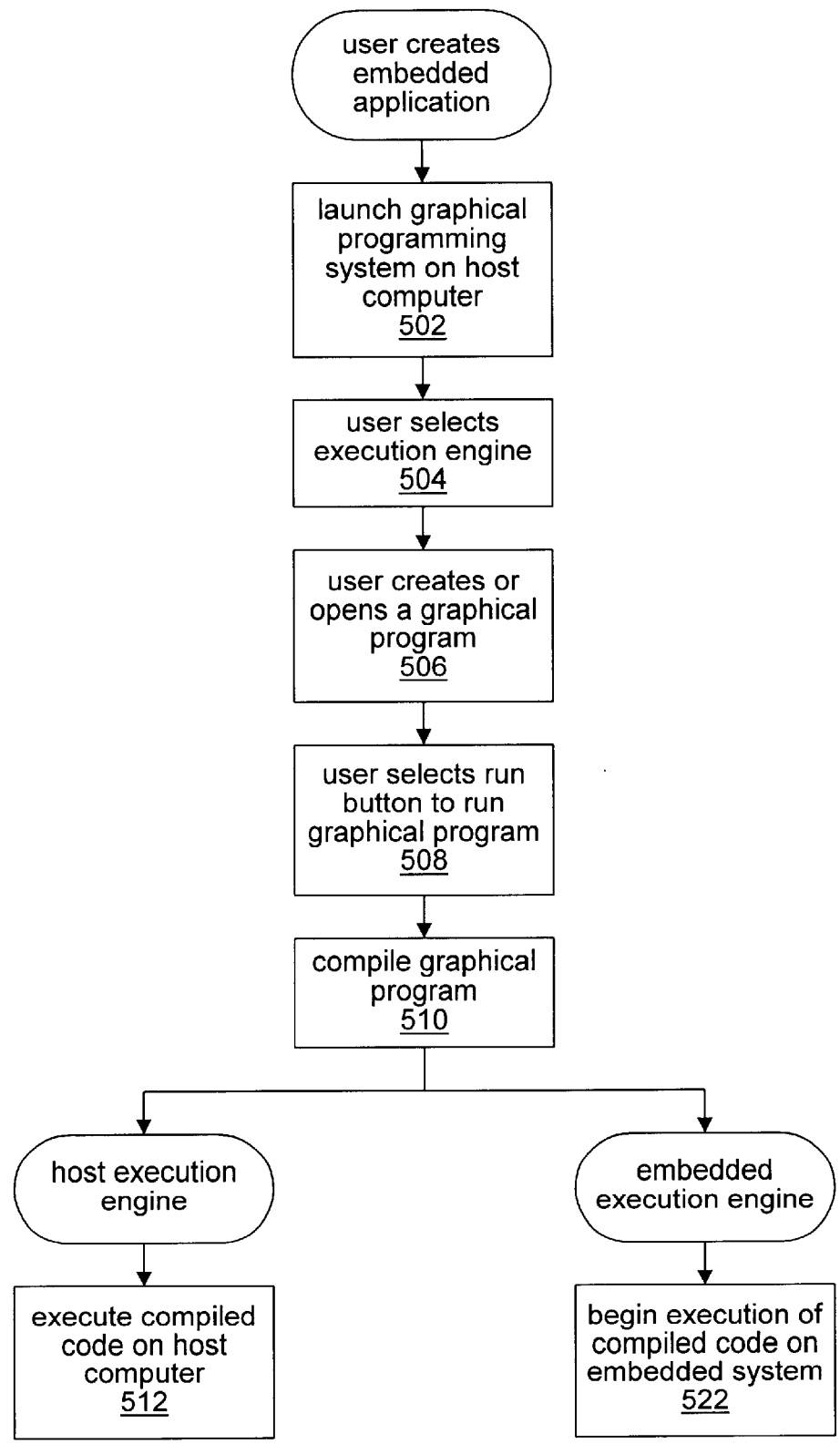
FIG. 6 is a flowchart diagram illustrating creation of an embedded graphical program according to the preferred embodiment of the invention.

Referring now to FIG. 6, a flowchart diagram is shown illustrating operations where by the user creates a graphical program for execution in an embedded system according to the present invention. As shown, in step 502 the user launches the host graphical programming system on the host computer 102. In other words, in response to user input, the host computer system 102 launches the executable of the host graphical programming system to run the graphical programming system on the host computer 102.

In step 504 the user selects an execution engine for execution of the graphical program. In other words, in step 504 the computer system 102 receives and stores user input regarding which execution engine is to execute the graphical program. In the embodiment shown in FIG. 3, two execution engines are comprised in the system, one being in the host computer 102 associated with the main graphical programming system, and a second associated with the embedded graphical programming system comprised in the embedded system. It is noted that a plurality of embedded systems may be coupled to the host computer 102, either directly or through a network. It is also noted that the execution engine can be selected prior to launching the graphical programming system or after a graphical program has been created or opened.

The user can select the execution engine in various manners. In one embodiment, in step 504 the host computer 102 displays a dialog box regarding selection of an execution engine. The host computer 102 displays the dialog box in response to a user preference setting in a preferences dialog that indicates that a dialog box should be displayed to enable the user to select the execution engine. Thus, in this embodiment, the preferences menu includes a setting which allows the user to select whether to display the dialog box or not. This is used to disable the display of the dialog box, for example, when the user is primarily using the host graphical programming system to create host applications, and the user does not wish to be bothered with having to provide input to this dialog box every time the graphical programming system is launched. In one embodiment, if the user launches LabVIEW through a command line, the user can include an argument specifying the desired execution engine. Alternatively, the user can create an icon representing the graphical programming system which automatically specifies one of the execution engines.

After the user has launched the host graphical programming system, e.g. host LabVIEW, in step 502 and has selected the desired execution engine in step 504, in step 506 the user creates or opens a graphical program. Step 506 presumes that a graphical programming development system is stored in the memory of the host computer system for creation of graphical programs. In the preferred embodiment, the graphical programming system is the LabVIEW graphical programming system available from National Instruments. In this system, the user creates the graphical program in a graphical program panel, referred to as a block diagram window and also creates a user interface in a graphical front panel. In the preferred embodiment, the graphical program comprises a graphical data flow diagram which specifies functionality of the program to be performed. This graphical data flow diagram is directly compilable into machine language code for execution on the computer system 102. For more information on creating a graphical program or virtual instrument (VI) in LabVIEW, please see the above patent applications. The host graphical programming system thus provides a seamless environment in which the user can develop an embedded application using high level graphical programming techniques.

After the user has created or opened a graphical program in step 506, in steps 508 and 510 the user compiles the graphical program, i.e., user input is received indicating that the graphical program should be compiled. In the preferred embodiment of the LabVIEW graphical programming system, the user selects the run button in step 508, which automatically causes the graphical program to be compiled into machine language in step 510. Thus in step 510 the host LabVIEW compiler compiles the graphical program.

Once the graphical program has been compiled into machine language in step 510, the system determines whether the machine language or executable portion of the program is to run on the host computer or on the embedded computer. In other words, the system determines which execution engine has been selected by the user. If the host computer 102 has been selected by the user, then the machine language or compiled version of the graphical program is executed in the host computer 102, i.e., on the host CPU 160, as is normally done in LabVIEW.

If the user has selected the embedded execution engine, then in step 522 the host computer 102 operates to transfer the machine language code corresponding to the graphical program to the embedded system to begin execution of the compiled code on the embedded system.

Figure 7:
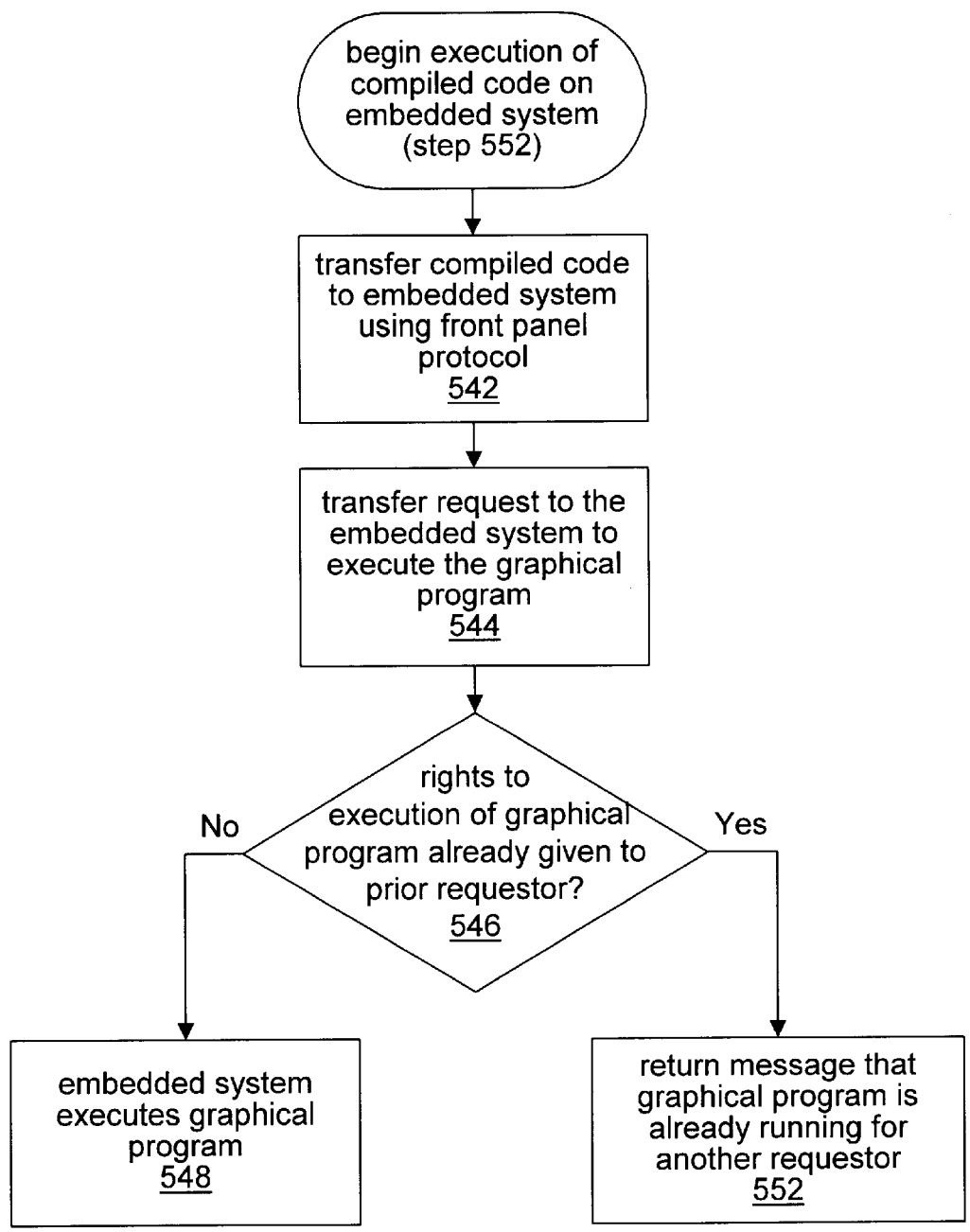
FIG. 7 is a flowchart diagram illustrating beginning execution of the embedded graphical program.

FIG. 7—Beginning Execution of Compiled Code on Embedded System

Referring now to FIG. 7, a flowchart diagram is shown illustrating the steps performed in step 522 of FIG. 6. As shown, in order to begin execution of the compiled code on the embedded system, the following steps are performed. First, in step 542, the host computer 102 operates to transfer the machine language code corresponding to the graphical program to the embedded system, this time using a higher level front panel protocol. This higher level front panel protocol preferably utilizes an underlying data transfer protocol. In the present embodiment where the embedded system is the interface card 114, the front panel protocol sits on top of the shared memory protocol. In a networked embodiment, the front panel protocol utilizes the underlying network protocol, such as Ethernet.

The front panel protocol operates to provide further information regarding the identity of the data being transferred. This allows more intelligent transfer of the various components of the machine language code forming the graphical program or VI. This allows the embedded system to properly identify and configure the compiled graphical program in its memory for execution. It is noted that, if the compiled graphical program has been previously transferred and stored in the embedded system, then the transfer in step 542 is not required.

Figure 9:
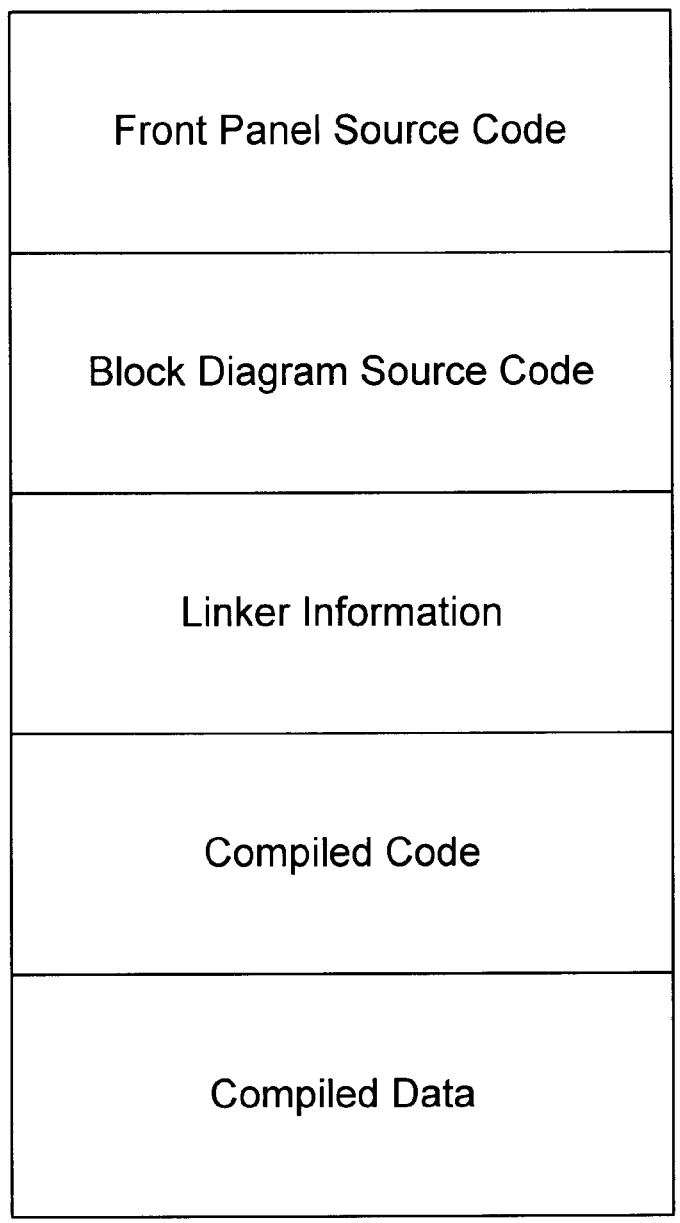
FIG. 9 illustrates the elements of a graphical program.

Referring now to FIG. 9, in the preferred embodiment where the LabVIEW graphical programming system is used, a graphical program comprises the following components. As shown, a graphical program comprises front panel and block diagram source code portions, linker information, executable code, and data. In the preferred embodiment, the front panel and block diagram source code remains in the host computer 102, and the linker information, executable code, and data are transferred to the embedded system. The executable code or machine language code includes data structures which represent the controls and indicators that are to be displayed on the front panel. However, as discussed further below, the actual code which operates to display these controls and indicators and display and update data within these controls and indicators, referred to as the editor portion, is preferably comprised in the host graphical programming system executing on the host computer 102.

Once the machine language representing the VI has been transferred to the memory in the embedded system in step 542, in step 544 the host computer 102 transfers a request to the embedded system to execute the compiled graphical program. Here it is noted that in various configurations, such as in a network, various host devices can request the embedded system to execute a respective graphical program or VI. In order to prevent a race condition in this instance, in step 544 the host computer 102 transfers a request to the embedded system to execute the compiled graphical program.

In response to this request, in step 546 the embedded system determines if the rights to execution of the compiled graphical program have already been given to a prior requester. If so, then in step 552 the embedded system returns a message to the host computer 102 that the compiled graphical program is already executing for another requester. If the rights to execution of the compiled graphical program have not already been given to a prior requester in step 546, then in step 548 the embedded system executes the graphical program.

Embedded System Execution of the Graphical Program

Figure 8:
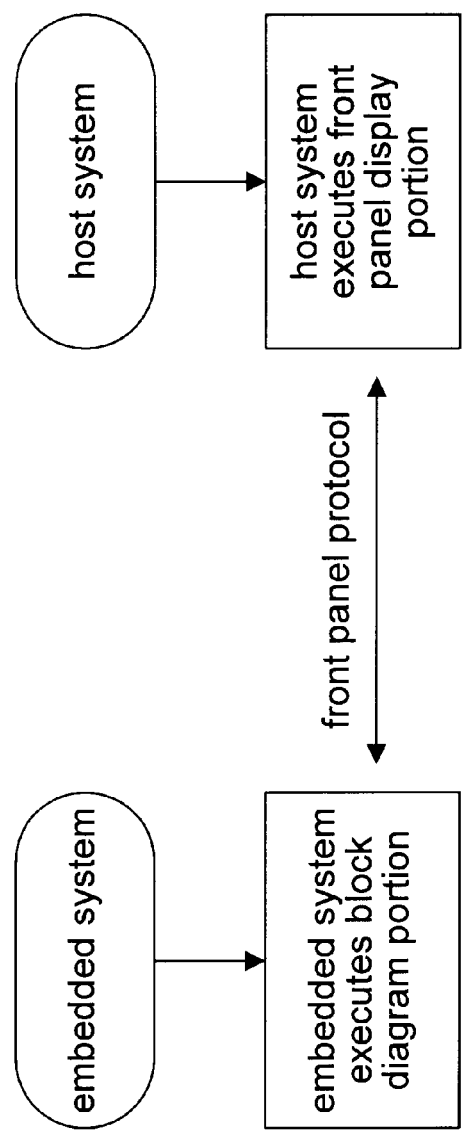
FIG. 8 is a flowchart diagram illustrating execution of the embedded graphical program.

As noted above, in step 548 the embedded system executes the graphical program, i.e., the embedded CPU 212 executes the machine language to implement the graphical program inside the embedded system. FIG. 8 is a simplified diagram illustrating execution of the graphical program in the embedded system. As shown, in step 602 the embedded system executes block diagram portion, and in step 604 the host system executes the front panel portion of the graphical program When a graphical program or VI is executed in the embedded system, execution of the block diagram portion of computation portion proceeds in a similar manner as if the graphical program were being executed inside the host computer 102. However, for front panel operation, i.e., I/O to/from the graphical program, the actual code for implementing the front panel display resides in the host computer 102.

Figure 10:
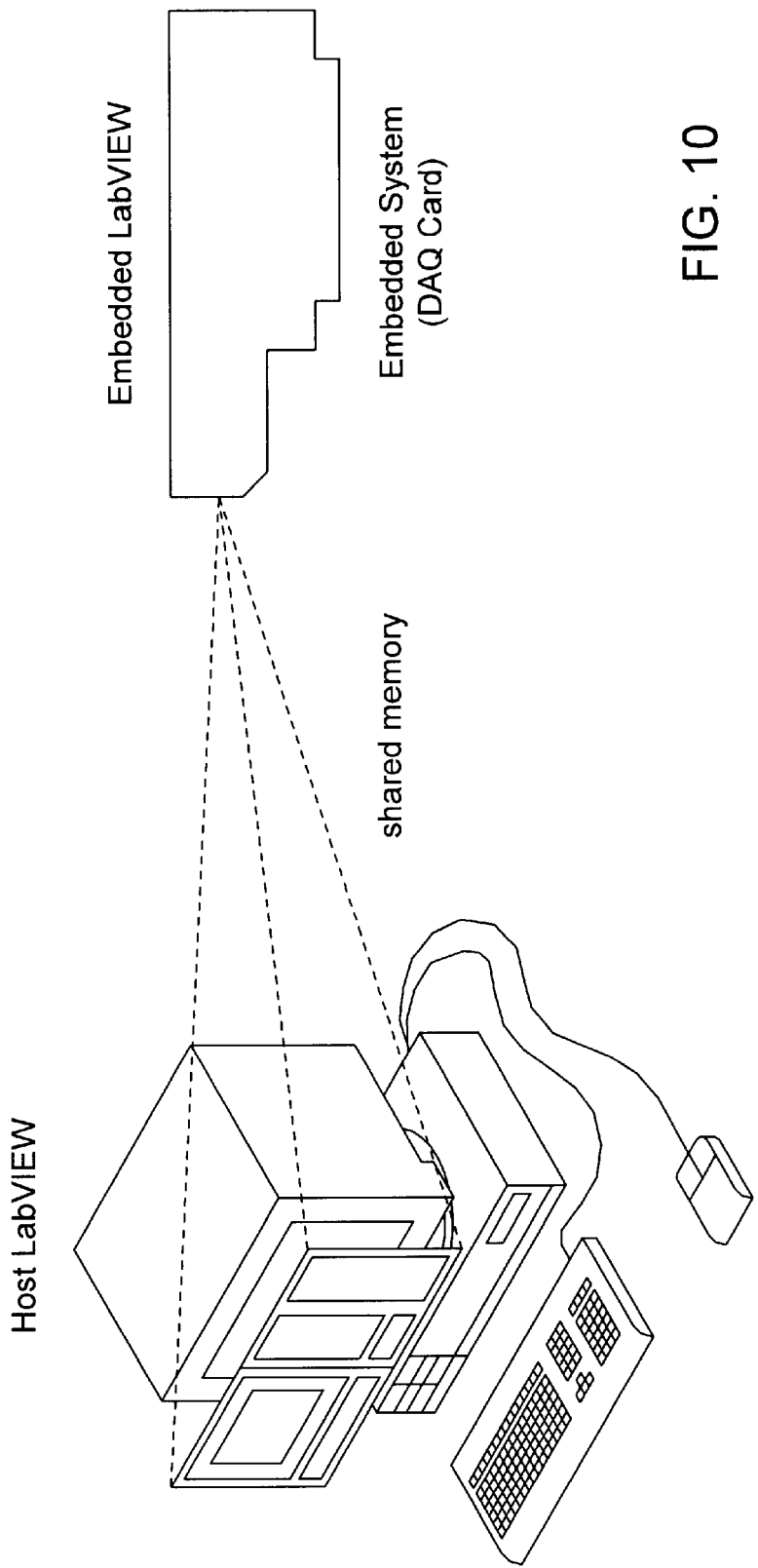
FIG. 10 conceptually illustrates a graphical program executing on the embedded system, and the host LabVIEW implementing the user interface or front panel for the graphical program.

In the preferred embodiment, when a graphical program is to be executed on the embedded system, the computation portion of the VI or graphical program is compiled into machine language and is downloaded and executed on the embedded system. In addition, the machine language code includes structures which represent the controls and indicators that are to be displayed on the front panel of the graphical program. However, the actual code which operates to display these controls and indicators and display and update data within these controls and indicators, referred to as the editor portion, is comprised in the graphical programming system which executes on the host computer 102 and is not part of the embedded LabVIEW comprised on the embedded system. Therefore the computation or block diagram portion of the graphical program executes on the embedded system. However, all I/O, either user provided input or output required to be displayed on the front panel, is handled by the editor executing on the host system 102. This is illustrated conceptually in FIG. 10, whereby the graphical program executes on the embedded system, and the host LabVIEW implements the user interface or front panel for the graphical program, using the shared memory for communication.

Thus for user I/O, when the user provides input to a control, the host computer 102 performs the display operations and is required to transfer the input data to the embedded system using the front panel protocol and the shared memory as described above. In a similar manner, when execution of the compiled graphical program in the embedded system generates output which is necessary to be displayed on the front panel of the VI, then the embedded system utilizes the front panel protocol and the shared memory to transfer the output to the LabVIEW editor executing on the host computer 102, which operates to display the data on the display screen. Thus, when a graphical program or VI is executing on the embedded system, the user can operate/view the controls and indicators of the graphical program on the display of the host computer as if the graphical program were executing directly on the host system.

In one embodiment, the user can input a selection which prevents display of updates of output data in order for increased speed and efficiency in the real time embedded system.

The present invention also allows programmatic control of graphical programs or VIs in embedded LabVIEW from host LabVIEW. In the preferred embodiment, the host and embedded LabVIEW programs each include a set of VIs or graphical programs and/or a C library, that to allow programmatic control of each program. These VIs or graphical programs on each of the host and embedded LabVIEW can communicate, such as by accessing the reserved portion of shared memory or using a network protocol. This enables a user to build an application in which a portion runs on the host computer 102 and a portion runs on the embedded system. For example, the user can create an application in which the user interface/data logger VIs execute on the host computer 102 and control/data acquisition VIs execute on embedded LabVIEW. The host LabVIEW can thus act, for example, as an independent application communicating with embedded LabVIEW, such as through the shared memory.

The embedded system provides more deterministic and/or real time performance for execution of applications. The embedded graphical programming system, e.g., embedded LabVIEW, provides determinism due to the following. First, embedded LabVIEW has no direct user interface. Also, there is no interference in program execution, such as from disk caching, and no overhead, e.g., driver call overhead, from the OS. Embedded LabVIEW is also the only application running in the system. Finally, embedded LabVIEW is running on top of a real-time operating system, as opposed to a desktop non-real-time system.

Execution of Attribute Nodes

It is noted that the embedded system executes a graphical program somewhat differently for certain constructs comprised within a graphical program. For example, the LabVIEW graphical programming system includes attribute nodes which are placed in a program to allow a user to programmatically control front panel objects, such as controls and indicators. When the execution engine in the embedded system arrives upon execution of an attribute node, the execution system recognizes that an attribute node is substantially solely involved with the program changing values or other information on front panel objects, such as controls or indicators. In this case, it is impossible for the execution system to execute the attribute node because the attribute node is intricately involved with changing parameters or attributes associated with front panel objects, and this code resides solely on the host computer 102. Therefore, in the preferred embodiment, for attribute nodes, the execution engine in the embedded system operates to transfer a pointer to where the code execution should begin as well as the necessary data to perform the operations. The host computer 102 can then execute this portion of the code. The embedded system only transfers a pointer and the necessary data to the host, since the code necessary to execute the attribute node already resides on the host. When the host computer has completed execution of this portion of code associated with the attribute node, the host computer 102 operates to modify the front panel accordingly and provides any results to the execution engine for it to use in execution of the remainder of the graphical program.

Shared Memory Protocol

In the preferred embodiment where the embedded system is an interface card, the host computer 102 and the embedded system each include a Shared Memory Communication (SMC) Manager which implements the shared memory protocol. The SMC Manager is a simple, low level driver that provides the ability to send and receive streams of bytes through the shared memory 230.

The SMC Manager comprises two layers: A top layer that presents a Winsock like API, and a Physical layer that accesses the shared memory. The SMC Manager provides the most basic services (read, write, callback) to its client. The top (Winsock) layer is preferably simplistic due to the use of shared memory, e.g., because the top layer does not have to handle lost packets or packets arriving out of sequence. The physical layer carries out the actual reading and writing to shared memory.

The Winsock layer is a very thin veneer over the physical layer. Thus, in the Shared Memory Manager, the physical layer performs most of the work. When a LAN is supported as a physical medium, the Winsock layer expands to include the TCP protocol, and an IP layer is inserted between the Winsock layer and the physical layer.

The SMC Manager provides a connection between two entities so that they can exchange data. The two entities will usually reside in two different systems (e.g. one on the host PC and one on the embedded system, e.g., the intelligent DAQ card). Thus, each system has its own SMC Manager. The SMC protocol is preferably a peer-to-peer protocol and there is no master/slave hierarchy. The SMC managers are referred to below as host and slave SMC managers for convenience.

Figure 12:
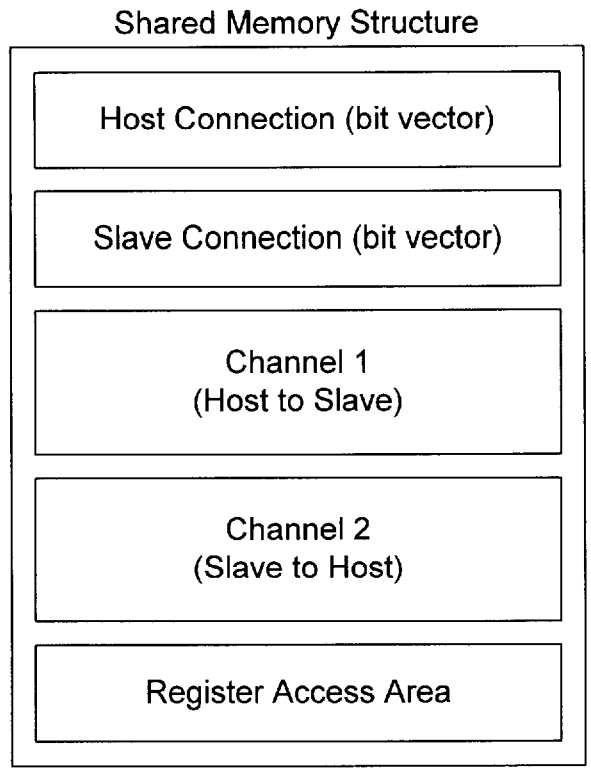
FIG. 12 illustrates the shared memory structure of the shared memory protocol used for communication between the host LabVIEW and embedded LabVIEW.

The shared memory is subdivided into a number of areas. Part of the shared memory is reserved for register access, and the rest is dedicated to the shared memory protocol. The shared memory is structured as shown in FIG. 12.

1. Establishing Connection

The shared memory block includes two connection vectors—one for the host SMC and one for the slave SMC—that indicate which connection is desired to be open. Each bit in the vector corresponds to a connection number. The bits in the connection vector are set when the open function with the corresponding connection number is called. The bits are reset when the close function is called. A connection is established when the corresponding bits in both the host and slave connection vector are set.

It is noted that the connection vectors are not a perfectly reliable way to determine that a connection is valid, e.g., one side could reboot without resetting the connections.

The number of connections that can be opened is limited by the number of bits used for the connection vectors. In the preferred embodiment, 32 connections are available.

2. Data Transfer

Figure 13:
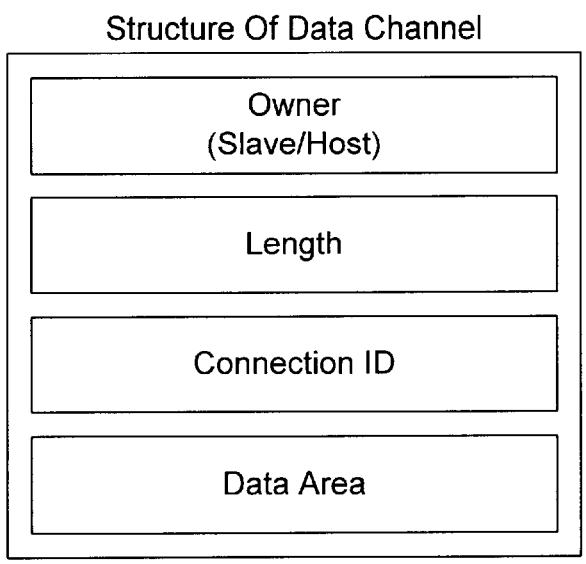
FIG. 13 illustrates the structure of a data channel in the shared memory protocol.

The data transfer scheme uses two unidirectional channels. Each channel is structured as shown in FIG. 13. If the sender owns the channel, it can move data to the data area, set the length and transfer ownership of the channel to the receiver. When the receiver obtains the ownership of the channel, it can get transfer data out of the channel, and when it's done, it can transfer the ownership back to the sender. The receiver cannot read the data area until it has ownership, and the sender cannot write to the data area until it has the ownership.

3. User Interface Considerations

There is no direct user interface to the SMC Manager.

4. Alternate Embodiment

Figure 14:
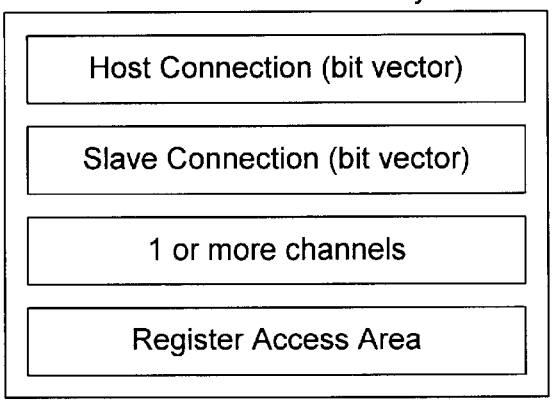
FIG. 14 illustrates the structure of a shared memory block in the shared memory protocol.

In an alternate embodiment, bi-directional channels are used. Bi-directional channels may be used because the scheme of two uni-directional data channels may not lead to the most efficient use of resources. For example, if one side is sending small packets and the other is sending large packets, then one data channel is under utilized and the other is overburdened. Bi-directional channels remedy this problem. However, bidirectional channels are more complicated, and having to contend for the token may cause delays itself. FIG. 14 illustrates the structure of the shared memory bank using bi-directional channels.

Figure 15:
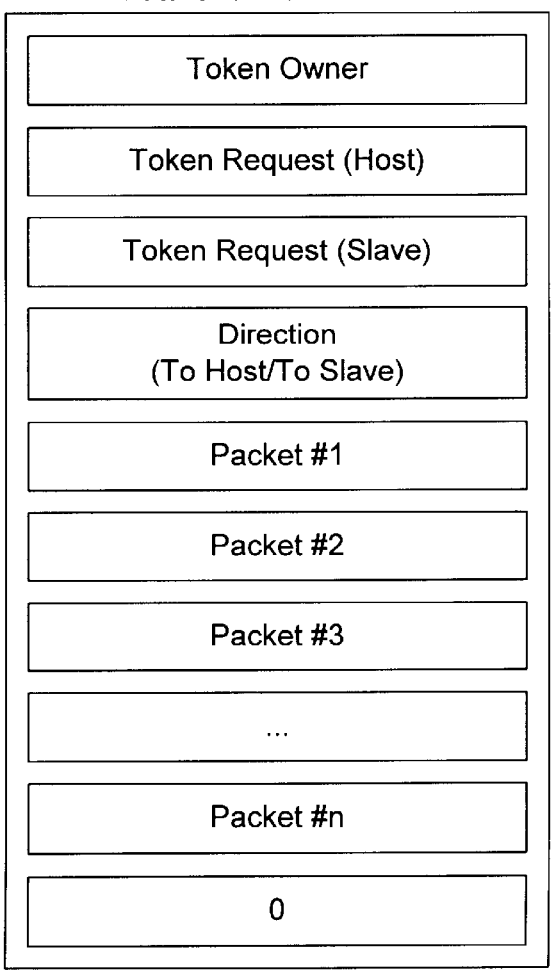
FIG. 15 illustrates the data channel structure in the shared memory protocol.

FIG. 15 the data channel structure. Each data channel comprises a data area and a control area. The data area is used for the actual data transfers, while the control area is used for house-keeping and connection management.

Since the two sides of the connection cannot both write to the data area simultaneously, tokens are used to arbitrate who has read/write privilege to different fields of the shared memory block. FIG. 16 illustrates the privileges of token owners and non-owners. Only one side (the token owner) can read or write the data area at any time. The control area permits concurrent write/write (not to the same location), read/write, read/read operations—subject to limitations of privileges.

The table of FIG. 16 summarizes the privileges of token owners and non-owners with regards to the different fields in the shared memory block. As shown, only the token owner can change the Token Owner field (i.e. to pass the token to the other side). The non-owner obviously cannot change this field. The SMC Manager can always read and write to it's own Token Request flag. However, it only makes sense to change the request flag to true if it doesn't have the token (in order to request for it) and change the flag to false if it already has the token. The token owner has to be able to read the Token Request flag of the other side, so it can pass the token to the other side if requested. The non-owner cannot read the Token Request flag because it has no token to pass. The nonowner cannot read the data area because the data area might be in a inconsistent state (e.g. the length field is wrong). The token owner will make sure the data area is in a consistent state before passing the token.

It is noted that there is not a case where both sides have write privilege to the same field at any time. So even while concurrent writes are permitted in the control area, there will not be concurrent writes to the same field or location.

5. Basic Operation

If the token owner needs to send data, it writes the data to the data area and passes the token to the other side. Once the other side has the token, it can read out the data from the data area.

If the non-owner needs to send data, it needs to wait until it has the token—which it can obtain in one of two ways. One, if the other side sends it data, the token will be passed along with the data. Otherwise, the non-owner can "request" the token by setting the Token Request flag. Once the other side sees this request, it will pass the token (with or without data).

6. Flow Control

When the SMC Manager reads data from the shared memory, it stores the data in a read buffer. Each connection preferably has its own read buffer. When the client calls the read function the client obtains the data out of the read buffer. When a read buffer is full, the SMC Manager discards data in the shared memory block without transferring it to the read buffer (to free the shared memory for further transactions). Clients also have a mechanism to detect loss of data and compensate for it by re-transmission.

Front Panel Protocol

The front panel protocol is a high level communication protocol which is used by the host LabVIEW and embedded LabVIEW. The host LabVIEW and embedded LabVIEW communicate with each other using the front panel protocol. The front panel protocol defines a format of data and commands that are transmitted back and forth to enable transmission of graphical program objects, software components and other data between host LabVIEW and embedded LabVIEW.

For an interface card comprised in the computer system, the front panel protocol uses the shared memory protocol described above in performing the actual transfers. The front panel protocol uses the Winsock API and effectively sits on top of the Winsock API. In an alternate embodiment where a networked environment is used, a different underlying protocol is used, such as Ethernet. The front panel protocol transmits data as a sequence of packets, wherein each packet is a collection of data sent as a single message During execution of a graphical program on the embedded system, the front panel protocol defines the format of data and commands that are transmitted back and forth to provide proxy controls and indicators on the host for the graphical program executing on the embedded system. As mentioned above, during execution of a compiled graphical program on the embedded system, the host CPU executes front panel display code to display on the screen the graphical front panel of the graphical program. The host LabVIEW and embedded LabVIEW use the front panel protocol to communicate I/O data back and forth to accomplish this split execution. The host graphical programming system or host LabVIEW thus provides the user interface for graphical programs executing on the embedded system. The host LabVIEW thus essentially acts as the front panel "browser" for embedded LabVIEW applications.

The front panel protocol is also used for downloading of graphical programs or VIs to the embedded system. Using the front panel protocol, the host LabVIEW operates to download a graphical program or VI by breaking the graphical program into pieces and sending them with any required information so that the graphical program can be reconstructed by the embedded system.

Further, as described below, the front panel protocol is used for single stepping/debugging a graphical program executing on the embedded system.

As noted above, the host LabVIEW can also act as an independent application communicating with embedded LabVIEW through the shared memory, preferably using the shared memory protocol, or the front panel protocol.

Debugging a Graphical Program Executing on the Embedded System

The present invention provides the user the ability to debug a graphical program application which is executing on the embedded system, wherein the debugging is performed using graphical front panels and other graphical information displayed on the display screen of the host computer. Further, the user is able to debug a graphical program application which is executing on the embedded system by opening and viewing the block diagram of the graphical program application on the host computer using the host LabVIEW. Thus, as the compiled graphical program executes on the embedded system, the host computer displays the block diagram and/or front panel for debugging purposes.

Figure 11:
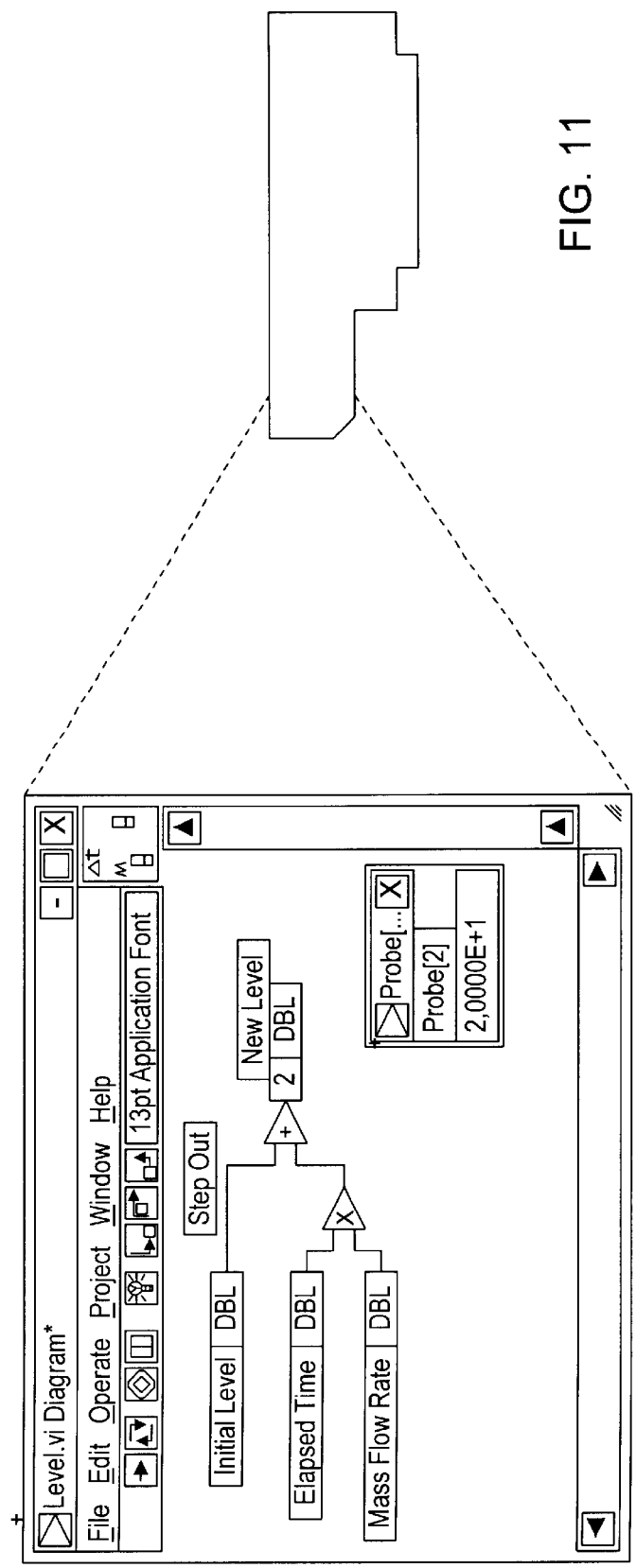
FIG. 11 conceptually illustrates the front panel displayed on the host computer 102 being used for debugging a graphical program executing on the embedded system.

The user can thus use various familiar graphical programming debugging techniques for a graphical program executing on the embedded system, including single stepping through the graphical program, execution highlighting, setting break points in the graphical program, and remote probing of nodes in the graphical program. FIG. 11 conceptually illustrates the front panel displayed on the host computer 102 being used for debugging a graphical program executing on the embedded system.

The embedded system provides data regarding graphical program execution to the host computer, and the host computer displays this information for debugging purposes.

Further, the user can enter input, such as selected nodes to be probed or enabling the next node to execute in single-step mode, and this information is provided to the embedded system to cause the desired execution. Thus, the user can use the host computer CPU and display screen for displaying the front panel and/or block diagram for debugging purposes for a graphical program executing on the embedded system.

Execution highlighting is used for debugging purposes to view an animation of the execution of the VI block diagram. With execution highlighting, the movement of data from one node to another is marked by objects or bubbles moving along the wires. When execution highlighting is enabled for a graphical program executing on the embedded system according to the present invention, as the graphical program executes on the embedded system, the embedded system provides execution status data to the host computer to enable the host computer to display bubbles moving along the wires of the block diagram, wherein the bubbles represent execution of the graphical program on the embedded system.

Execution highlighting is commonly used with single-step mode to gain an understanding of how data flows through nodes in the graphical program. In single-stepping mode, the user presses a step button to proceed to execution of a subsequent node in the graphical program. Also, during execution of a current node, the next node to be executed blinks rapidly. According to the present invention, the embedded system provides execution status data to the host computer informing the host computer as to which node is currently being executed, and to enable the host computer to blink the next node to be executed. Also, as the user enters input to proceed to execution of the next node, the host computer provides this user input to the embedded system to direct the embedded system to execute the next node in the graphical program.

DLL Nodes

The present invention includes a mechanism for embedded LabVIEW to load DLLs and to invoke or call functions in DLLs. These DLLs may be generated by the native development tools (specifically the linker) provided by the real-time operating system used in the embedded system, or by development tools used for desktop computer systems (e.g. Microsoft Visual C++). In the latter case, because the DLLs generated by desktop development tools are not intended to be used in real-time operating systems, some modification or 'patching' is necessary to make the DLL compatible with the embedded system. The importance of having the ability to use DLLs generated by desktop development tools is for user convenience, such that the user is not required to purchase any additional real-time development tools (specifically the linker) in order to take advantage of the flexibility provided by DLLs.

DLLs are normally loaded from disks or other non-volatile media. Because of the absence of such non-volatile media in the embedded system, an alternative method is required. The loading of DLLs is somewhat similar to the process of initial booting—the embedded system requests the DLL from the host system, using the shared memory protocol as the conduit. An application on the host system reads the requested DLL from its hard disk and supplies the DLL to the embedded system.

Loading and Relocating CINs

The present invention includes a mechanism for loading and relocating code interface nodes (CINs).

Error Reporting

In the preferred embodiment, errors generated during execution of the graphical program on the embedded system are provided to the host system for display on the screen.

Resource Management

The present invention includes a method for defining and ensuring behavior of LabVIEW when a VI requests a resource that does not exist. MORE The present invention also intelligently handles File 10, Front Panel Attributes, Networking New Primitives The present invention includes new basic primitives which allow the user to build deterministic control loops. For example, one new primitive allows a user to specify skew in the "Wait for multiple ms" primitive.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for executing a graphical program in a system comprising a host computer system and a device, wherein the host computer system includes a host CPU, a host memory and a display, wherein the device is coupled to the computer system, wherein the device includes an embedded CPU and an embedded memory, the method comprising:

storing a graphical program in the host computer system, wherein the graphical program includes a diagram comprising a plurality of nodes;

compiling the graphical program in the host computer system to produce a compiled graphical program;

downloading at least a portion of the compiled graphical program to the embedded memory comprised on the device;

the device executing the at least a portion of the compiled graphical program;

the device transferring debugging information to the host computer system during the device executing the at least a portion of the compiled graphical program;

the host computer displaying on the display the diagram of the graphical program during the device executing the at least a portion of the compiled graphical program; and the host computer system displaying the debugging information in the diagram in response to said transferring, wherein the host computer system displaying the debugging information comprises the host computer system highlighting execution of said nodes in the diagram as said nodes are executed in the device.

2. The method of claim 1, wherein the debugging information comprises data values output from one or more of said plurality of nodes as said nodes are executed in the device;

wherein the host computer displaying the debugging information comprises the host computer displaying said data values output from one or more of said plurality of nodes as said nodes are executed in the device.

3. The method of claim 1, further comprising:

the host computer system receiving single step input from a user to single step through execution of the compiled graphical program executing in the device;

the host computer system providing said single step input to the device;

the device executing one or more nodes in the compiled graphical program in a single step fashion in response to said single step input.

4. The method of claim 1, further comprising:

the host computer system executing a portion of the compiled graphical program during the device executing the at least a portion of the compiled graphical program.

5. A system for executing a graphical program, the system comprising:

a host computer system, wherein the host computer system includes a host CPU, a host memory and a display, wherein the host computer system stores a graphical program, wherein the graphical program includes a diagram comprising a plurality of nodes;

a device coupled to the host computer system, wherein the device includes an embedded CPU and an embedded memory, wherein the embedded memory stores a graphical program execution engine;

wherein the host computer system is operable to compile the graphical program to produce a compiled graphical program;

wherein the host computer system is further operable to download at least a portion of the compiled graphical program to the embedded memory comprised on the device;

wherein the device is operable to execute the execution engine to execute the at least a portion of the compiled graphical program;

wherein the device is operable to transfer debugging information to the host computer system when the device executes the at least a portion of the compiled graphical program;

wherein the host computer is operable to display on the display the diagram of the graphical program when the device executes the at least a portion of the compiled graphical program; and wherein the host computer system is operable to display the debugging information in the diagram, wherein the host computer system highlights execution of said nodes in the diagram as said nodes are executed in the device.

6. The system of claim 5, wherein the debugging information comprises data values output from one or more of said plurality of nodes as said nodes are executed in the device;

wherein the host computer system displays said data values output from one or more of said plurality of nodes as said nodes are executed in the device.

7. The system of claim 5, wherein the host computer system is operable to receive single step input from a user to single step through execution of the at least a portion of the compiled graphical program executing in the device;

wherein the host computer system is operable to provide said single step input to the device;

wherein the device is operable to execute one or more nodes in the compiled graphical program in a single step fashion in response to said single step input.

8. The system of claim 5, wherein the device is an adapter card comprised in the computer system.

9. A method for providing debugging information in a graphical program in a system comprising a host computer system and a device, wherein the host computer system includes a host CPU, a host memory and a display, wherein the device is coupled to the computer system, wherein the device includes an embedded CPU and an embedded memory, the method comprising:

the device executing a diagram of the graphical program, wherein the diagram comprises a plurality of nodes;

the host computer displaying on the display the diagram of the graphical program during the device executing the diagram of the graphical program;

the device transferring debugging information to the host computer system during the device executing the diagram of the graphical program, wherein the debugging information comprises data values output from one or more of said plurality of nodes as said nodes are executed in the device; and the host computer system displaying the debugging information in the diagram in response to said transferring, wherein the host computer displaying the debugging information comprises the host computer displaying said data values output from one or more of said plurality of nodes as said nodes are executed in the device.

10. A method for displaying debugging information of a graphical program in a system comprising a first computer system and a second computer system, wherein the first computer system includes a first CPU, a first memory and a first display, wherein the second computer system is coupled to the first computer system, wherein the second computer system includes a second CPU and a second memory, the method comprising:

the second computer system executing at least a portion of the graphical program, wherein the at least a portion of the graphical program is at least partly represented by a diagram comprising a plurality of nodes;

the second computer system transferring debugging information to the first computer system during the second computer system executing the at least a portion of the graphical program, wherein the debugging information comprises data values output from one or more of said plurality of nodes as said nodes are executed in the second computer system;

the first computer system displaying on the first display the diagram of the graphical program during the second computer system executing the at least a portion of the graphical program; and the first computer system displaying the debugging information in the diagram after said transferring, wherein the first computer system displaying the debugging information comprises the first computer system displaying said data values output from one or more of said plurality of nodes as said nodes are executed in the second computer system.

11. The method of claim 10, wherein the at least a portion of the graphical program is represented by a diagram comprising a plurality of connected nodes;

wherein the plurality of connected nodes visually indicate functionality of the graphical program.

12. The method of claim 11, wherein the graphical program is a graphical data flow program;

wherein at least a subset of the plurality of nodes are connected to visually indicate data flow among the nodes.

13. The method of claim 10, further comprising:

the first computer system receiving user input selecting a first one or more nodes to display data output during said executing;

providing said user input to the second computer system;

wherein the second computer system transferring debugging information to the first computer system comprises the second computer system transferring data values output from the first one or more nodes;

wherein the first computer system displaying the debugging information in the diagram comprises the first computer system displaying the data values output from the first one or more nodes.

14. The method of claim 13, wherein the first computer system displays the data values output from the first one or more nodes as the first one or more nodes are executed on the diagram.

15. The method of claim 10, wherein the debugging information comprises said nodes are executed in the second computer system;

wherein the first computer system displaying the debugging information comprises the first computer system highlighting execution of said nodes in the diagram as said nodes are executed in the second computer system.

16. The method of claim 15, further comprising:

the first computer system receiving single step input from a user to single step through execution of the at least a portion of the graphical program executing in the second computer system;

the first computer system providing said single step input to the second computer system;

the second computer system executing one or more nodes in the compiled graphical program in a single step fashion in response to said single step input.

17. The method of claim 10, further comprising:

the first computer system receiving user input selecting one or more breakpoints in the diagram;

providing said user input to the second computer system;

wherein said executing comprises the second computer system halting execution of the at least a portion of the graphical program at the one or more breakpoints in the diagram.

18. The method of claim 10, further comprising:

the first computer system executing a portion of the graphical program during the second computer system executing the at least a portion of the graphical program.

19. The method of claim 10, further comprising:

compiling the at least a portion of the graphical program prior to said executing to produce a compiled graphical program;

wherein said executing comprises the second computer system executing the compiled graphical program.

20. The method of claim 10, further comprising:

transferring the at least a portion of the graphical program to the second computer system prior to said executing.

21. The method of claim 10, wherein the graphical program includes a diagram and a user interface;

wherein said executing comprises the second computer system executing the diagram of the graphical program.

22. The method of claim 10, wherein the graphical program includes a diagram and a user interface;

wherein said executing comprises the second computer system executing the diagram of the graphical program and the user interface of the graphical program.

23. The method of claim 10, wherein the graphical program includes a diagram and a user interface;

the method further comprising:
    the first computer system displaying on the first display the user interface of the graphical program during the second computer system executing the at least a portion of the graphical program.

24. The method of claim 23, further comprising:

the first computer system displaying at least a portion of the debugging information in the user interface.

25. The method of claim 10, wherein the second computer system executing the at least a portion of the graphical program includes:
    generating output data for display in the user interface of the graphical program; and
    transferring the output data to the first computer system;
    the first CPU executing code from the first memory to present the user interface on the first display during the second computer system executing the at least a portion of the graphical program; and
    the first computer system displaying the output data in the user interface.

26. A system for executing a graphical program, the system comprising:

a first computer system, wherein the first computer system includes a first CPU, a first memory and a first display;

a second computer system coupled to the first computer system, wherein the second computer system includes a second CPU and a second memory, wherein the second computer system stores a compiled graphical program, wherein the compiled graphical program is a compiled version of a graphical program, wherein the graphical program is at least partly representable on a display as a diagram comprising a plurality of nodes;

wherein the second computer system is operable to execute the compiled graphical program;

wherein the second computer system is operable to transfer debugging information to the first computer system when the second computer system executes the compiled graphical program, wherein the debugging information comprises information to highlight execution of said nodes in the diagram as said nodes are executed in the second computer system;

wherein the first computer is operable to display on the first display the diagram of the graphical program; and wherein the first computer system is operable to display the debugging information in the diagram, wherein the first computer system highlights execution of said nodes in the diagram as said nodes are executed in the second computer system.

27. The system of claim 26, wherein the graphical program is representable on a display by a diagram comprising a plurality of connected nodes;

wherein the plurality of connected nodes visually indicate functionality of the graphical program.

28. The system of claim 27, wherein the graphical program is a graphical data flow program;

wherein at least a subset of the plurality of nodes are connected to visually indicate data flow among the nodes.

29. The system of claim 26, wherein the debugging information comprises data values output from one or more of said plurality of nodes as said nodes are executed in the second computer system;

wherein the first computer system displays said data values output from one or more of said plurality of nodes as said nodes are executed in the second computer system.

30. The method of claim 26, further comprising:

wherein the first computer system is operable to receive user input selecting a first one or more nodes to display data output during said executing;

wherein the first computer system is operable to provide said user input to the second computer system;

wherein the second computer system is operable to transfer data values output from the first one or more nodes to the first computer system;

wherein the first computer system is operable to display the data values output from the first one or more nodes.

31. The method of claim 30, wherein the first computer system is operable to display the data values output from the first one or more nodes as the first one or more nodes are executed on the diagram.

32. The system of claim 26, wherein the first computer system is operable to receive single step input from a user to single step through execution of the compiled graphical program executing in the second computer system;

wherein the first computer system is operable to provide said single step input to the second computer system;

wherein the second computer system is operable to execute one or more nodes in the compiled graphical program in a single step fashion in response to said single step input.

33. The system of claim 26, wherein the first computer system is operable to receive user input selecting one or more breakpoints in the diagram;

wherein the first computer system is operable to provide said user input to the second computer system;

wherein the second computer system is operable to halt execution of the compiled graphical program at the one or more breakpoints in the diagram.

34. The system of claim 26, wherein the second computer system is comprised on a card located in the first computer system.

35. The system of claim 26, wherein the second computer system is coupled to the first computer system over a network.

36. The system of claim 26, wherein the first computer system is operable to compile the graphical program to produce the compiled graphical program;

wherein the first computer system is further operable to transfer at least a portion of the compiled graphical program to the second memory comprised on the second computer system; and wherein the second computer system is operable to execute the at least a portion of the compiled graphical program.

37. The system of claim 26, wherein the second computer system is operable to compile the graphical program to produce the compiled graphical program.

38. The system of claim 26, wherein the graphical program is a virtual instrument.

39. The system of claim 26, wherein the second computer system operates as an instrument to acquire and measure data.

40. The system of claim 26, wherein the graphical program includes a diagram and a user interface;

wherein the first computer system is operable to display on the first display the user interface of the graphical program when the second computer system executes the compiled graphical program.

41. The system of claim 40, further comprising:

wherein the first computer system is operable to display the debugging information in the user interface.

42. The system of claim 26, wherein, in executing the compiled graphical program, the second computer system is operable to:

generate output data for display in the user interface of the graphical program; and transfer the output data to the first computer system;

wherein the first computer system is operable to:

present said user interface on the first display while the second computer system executes the compiled graphical program; and display the output data in the user interface of the graphical program.

43. A method for providing debugging information in a graphical program in a system comprising a first computer system and a second computer system, wherein the first computer system includes a first CPU, a first memory and a first display, wherein the second computer system is coupled to the first computer system, wherein the second computer system includes a second CPU and a second memory, the method comprising:

the second computer system executing a diagram of the graphical program, wherein the diagram comprises a plurality of connected nodes which visually indicate functionality of the graphical program;

the first computer system displaying on the first display the diagram of the graphical program during the second computer system executing the diagram of the graphical program;

the second computer system transferring debugging information to the first computer system during the second computer system executing the diagram of the graphical program; and the first computer system displaying the debugging information in the diagram after said transferring, wherein the first computer system displaying the debugging information comprises the first computer system displaying data values output from one or more of said plurality of nodes as said nodes are executed in the second computer system.

44. The method of claim 43, wherein at least a subset of the plurality of nodes are connected to visually indicate data flow among the nodes.

45. The method of claim 43, wherein the debugging information comprises execution highlighting information to highlight execution of said nodes in the diagram as said nodes are executed in the second computer system;

wherein the first computer system displaying the debugging information comprises the first computer system highlighting execution of said nodes in the diagram as said nodes are executed in the second computer system.

46. The method of claim 43, wherein the second computer system operates as an instrument to acquire and measure data.

47. A method for providing debugging information in a graphical program in a system comprising a first computer system and a second computer system, wherein the first computer system includes a first CPU, a first memory and a first display, wherein the second computer system is coupled to the first computer system, wherein the second computer system includes a second CPU and a second memory, the method comprising:

the second computer system executing a diagram of the graphical program, wherein the diagram comprises a plurality of connected nodes which visually indicate functionality of the graphical program;

the first computer system displaying on the first display the diagram of the graphical program during the second computer system executing the diagram of the graphical program;

the second computer system transferring debugging information to the first computer system during the second computer system executing the diagram of the graphical program; and the first computer system displaying the debugging information in the diagram after said transferring, wherein the first computer system displaying the debugging information comprises the first computer system highlighting execution of said nodes in the diagram as said nodes are executed in the second computer system.

48. The method of claim 47, wherein at least a subset of the plurality of nodes are connected to visually indicate data flow among the nodes.

49. The method of claim 47, wherein the first computer system displaying the debugging information comprises the first computer system displaying data values output from one or more of said plurality of nodes as said nodes are executed in the second computer system.

50. The method of claim 47, wherein the second computer system operates as an instrument to acquire and measure data.

* * * * *

UNITED STATES PATENT AND TRADEMARK OFFICE
CERTIFICATE OF CORRECTION

PATENT NO. : 6,715,139 B1
DATED : March 30, 2004
INVENTOR(S) : Kodosky et al.

It is certified that error appears in the above-identified patent and that said Letters Patent is hereby corrected as shown below:

Column 26,
Lines 46-52, Claim 15 should read:
-- The method of claim 10, wherein the debugging information comprises execution highlighting information to highlight execution of said nodes in the diagram as said nodes are executed in the second computer system;
    wherein the first computer system displaying the debugging information comprises the first computer system highlighting execution of said nodes in the diagram as said nodes are executed in the second computer system. --

Signed and Sealed this

Sixth Day of July, 2004

JON W. DUDAS
*Acting Director of the United States Patent and Trademark Office*